United States Patent
Otsuka

(10) Patent No.: US 9,690,665 B2
(45) Date of Patent: Jun. 27, 2017

(54) RELAY DEVICE, RELAY METHOD, COMPUTER-READABLE RECODING MEDIUM HAVING STORED THEREIN RELAY PROGRAM, AND RELAY SYSTEM

(71) Applicant: FUJITSU LIMITED, Kawasaki-shi, Kanagawa (JP)

(72) Inventor: Hiroshi Otsuka, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 244 days.

(21) Appl. No.: 14/488,335

(22) Filed: Sep. 17, 2014

(65) Prior Publication Data

US 2015/0120666 A1    Apr. 30, 2015

(30) Foreign Application Priority Data

Oct. 24, 2013    (JP) .................................. 2013-221350

(51) Int. Cl.
| | | |
|---|---|---|
| *G06F 17/30* | (2006.01) | |
| *G06F 11/14* | (2006.01) | |
| *H04L 29/08* | (2006.01) | |

(52) U.S. Cl.
CPC ...... *G06F 11/1446* (2013.01); *H04L 67/1097* (2013.01)

(58) Field of Classification Search
CPC ........................... G06F 11/1446; G06F 3/0641
USPC ......................................................... 707/646
See application file for complete search history.

(56) References Cited

U.S. PATENT DOCUMENTS

| | | | |
|---|---|---|---|
| 8,032,784 B2* | 10/2011 | Kumano et al. ............... | 714/6.2 |
| 9,170,747 B2* | 10/2015 | Toshine | |
| 2006/0112149 A1 | 5/2006 | Kan et al. | |
| 2013/0117515 A1* | 5/2013 | Ashmore et al. ............. | 711/162 |

(Continued)

FOREIGN PATENT DOCUMENTS

| | | |
|---|---|---|
| JP | 11-196149 A | 7/1999 |
| JP | 2005-135040 A | 5/2005 |
| JP | 2006-059201 | 3/2006 |

(Continued)

OTHER PUBLICATIONS

Hirofumi Ueda et al., A Message Transmission Control Scheme for Efficient Information Sharing in Disruption Tolerant Networks, 2010, 392-397.*

(Continued)

*Primary Examiner* — Jean B Fleurantin
(74) *Attorney, Agent, or Firm* — Fujitsu Patent Center

(57) ABSTRACT

A relay device includes a first storage unit, a second storage unit and a processor. The processor extracts a duplication pattern, which is an identical portion between data stored in the first storage unit in the past and data received currently. Also, the processor executes a process of storing the currently received data in the first storage unit and a process of associating an identifier with the extracted duplication pattern and storing the duplication pattern and the identifier in the second storage unit. Further, the processor edits data into edited data in which a duplication pattern included in the data has been replaced with the identifier associated with the duplication pattern when the data including a duplication pattern stored in the second storage unit has been received from a first device. Then, the processor transfers the edited data to a second device.

16 Claims, 18 Drawing Sheets

(56) References Cited

U.S. PATENT DOCUMENTS

2014/0025910 A1* 1/2014 Toshine .................. 711/162

FOREIGN PATENT DOCUMENTS

| JP | 2006-146580 A | 6/2006 |
|---|---|---|
| JP | 2011-175421 | 9/2011 |

OTHER PUBLICATIONS

Hirofumi Ueda et al., a message transmission control scheme for efficient information sharing in distributio tolerant networks, 2010, IEEE, 392-397.*

Japanese Office Action dated Mar. 28, 2017 for corresponding Japanese Patent Application No. 2013-221350, with Partial English Translation, 9 pages.

* cited by examiner

| PAYLOAD STORAGE THRESHOLD | SIZE THRESHOLD | NUMBER-OF-TIMES-OF-DETECTION THRESHOLD | DUPLICATION STORAGE THRESHOLD |
|---|---|---|---|
| 20 | 0x200 | 3 | 20 |

| PAYLOAD | | | | |
|---|---|---|---|---|
| 00012780 | 00000000 | 0000CCDD | 00000000 | ⋯ 00000000 FC4EDEBB 0000AACC |
| BCB53636 | 01030000 | 000A0000 | 08000008 | ⋯ 00000000 FC4EDEBB HC9665D5 |
| 55443366 | 22334563 | 00000000 | 00000000 | ⋯ 00000000 FC4990BB BC95D5D5 |
| 41325300 | 00FF4312 | 00000000 | 00000000 | ⋯ 00000000 00000000 984712H4 |
| 02303400 | 34FFBBAA | 123E3344 | AA456787 | ⋯ 24345FF4 F0ABCEFF 00002277 |
| ⋮ | | | | |

~22

| PATTERN IDENTIFIER | DETECTION FREQUENCY | DUPLICATION PATTERN | SIZE | USE CONDITION | NUMBER OF TIMES OF DETECTION | OXID | SID | DID |
|---|---|---|---|---|---|---|---|---|
| 0007 | 0033 | #### | 0x500 | EFFECTIVE | 3 | A001 | 1001 | 2001 |
| 0002 | 0029 | #### | 0x200 | NEW | 3 | A002 | 1002 | 2002 |
| ... | ... | ... | ... | ... | ... | ... | ... | ... |
| 0015 | 0002 | #### | 0x2d0 | DETECTED | 2 | A010 | 1010 | 2010 |
| 0017 | 0001 | #### | 0x400 | DETECTED | 1 | A011 | 1011 | 2011 |
| ... | ... | ... | ... | ... | ... | ... | ... | ... |

23

300

DUPLICATION PATTERN 00000000 00000000 00000000 · · · 00000000 00000000 00000000

02303400 34FFBBAA 123E3344 AA456787 · · 24345FF4 F0ABCEFF 00002277

...

41325300 00FF4312 00000000 00000000 · · · 00000000 BF546892 984712H4

BCB53636 01030000 000A0000 08000008 · · · · 00000000 FC4EDEBB HC9665D5

...

F I G. 7

| PATTERN IDENTIFIER | SIZE | POSITION INFORMATION |
|---|---|---|
| 0001 | 0x500 | 0040 |

F I G. 9

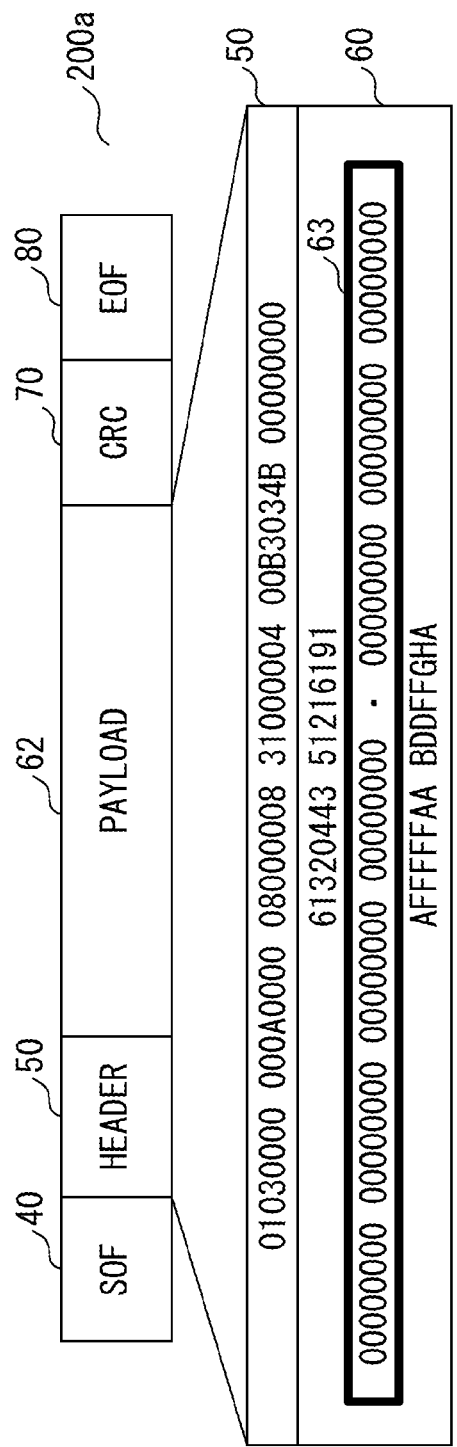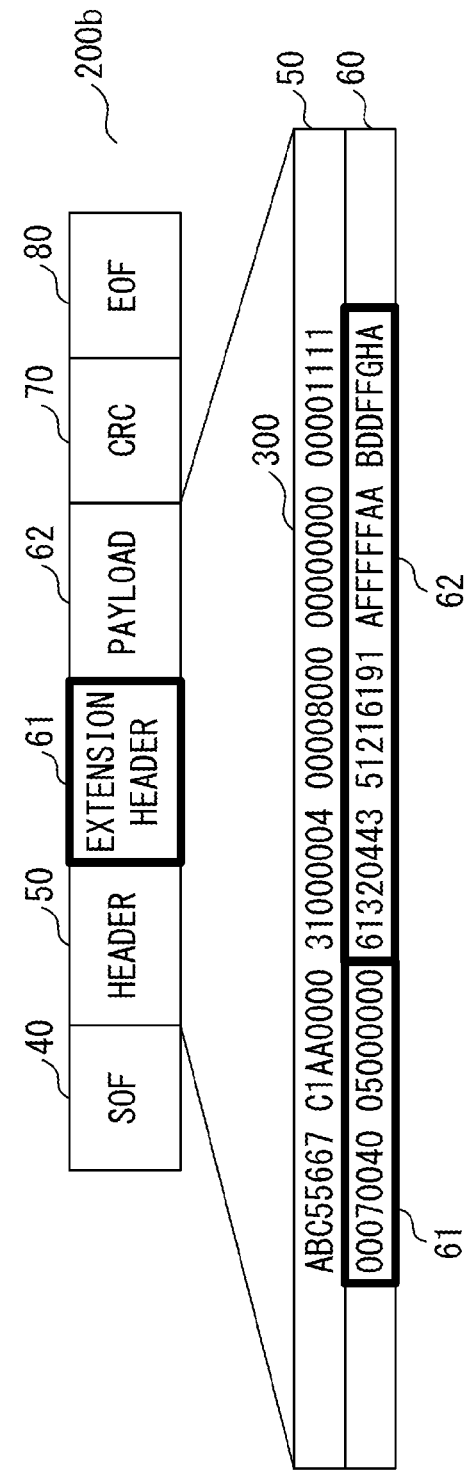

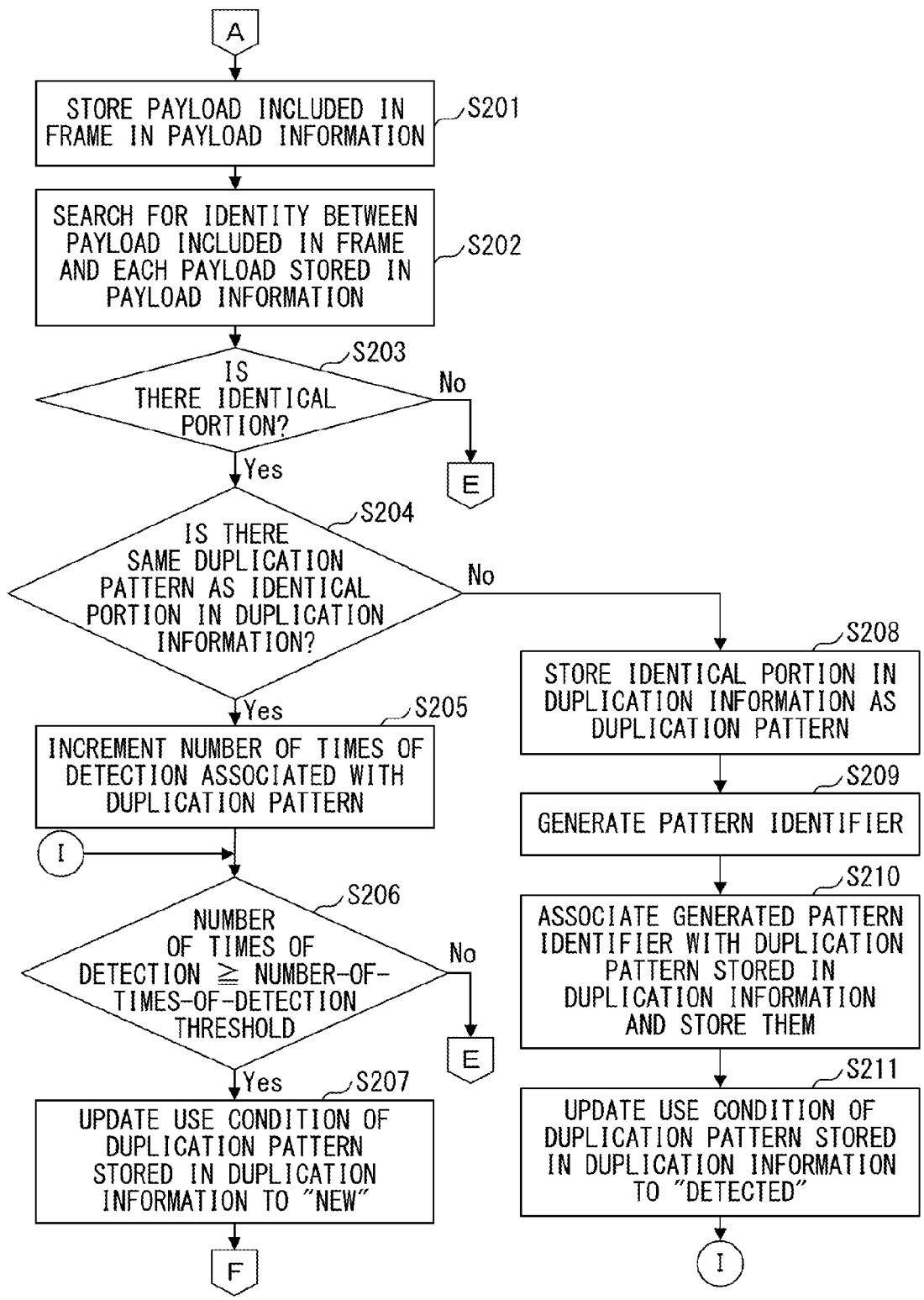
F I G. 1 3

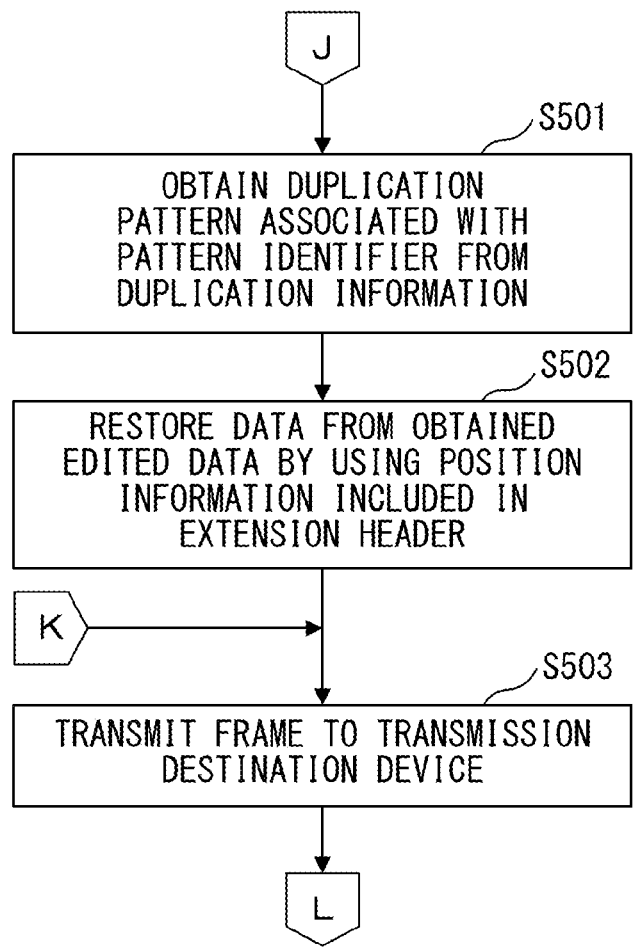
F I G. 1 6

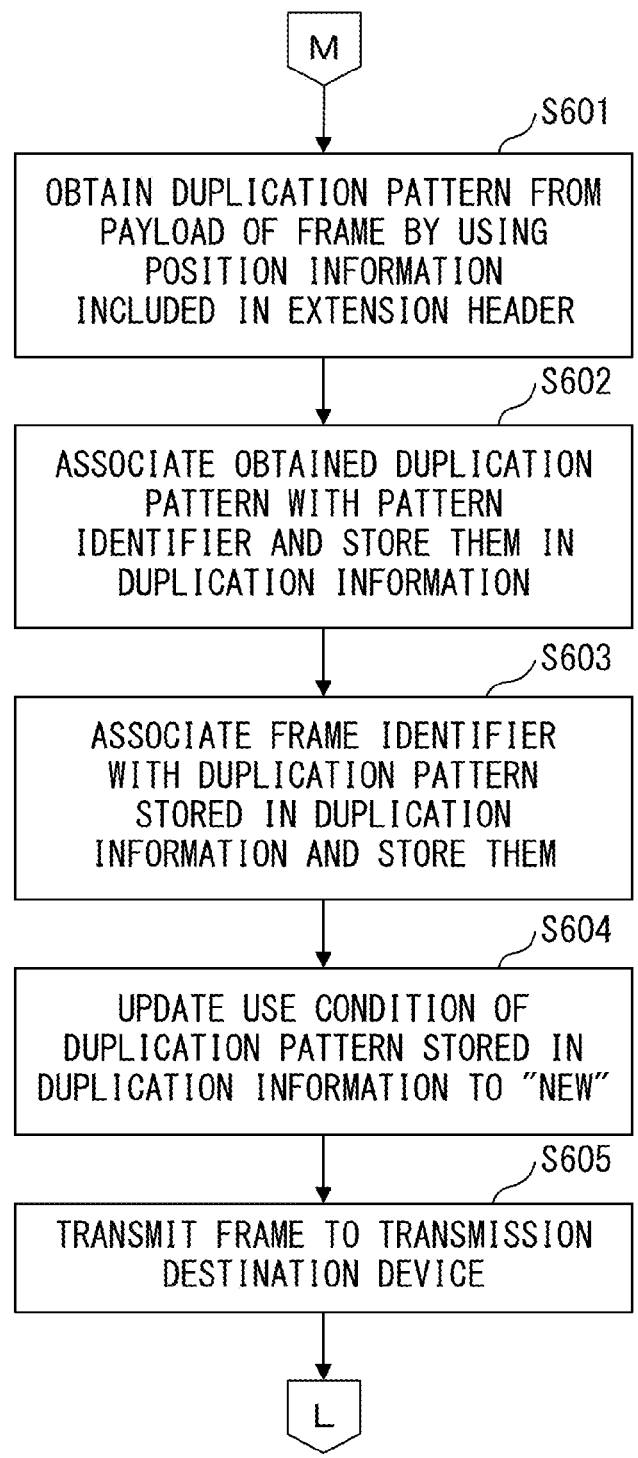
F I G. 1 7

RELAY DEVICE, RELAY METHOD, COMPUTER-READABLE RECODING MEDIUM HAVING STORED THEREIN RELAY PROGRAM, AND RELAY SYSTEM

CROSS-REFERENCE TO RELATED APPLICATION

This application is based upon and claims the benefit of priority of the prior Japanese Patent Application No. 2013-221350, filed on Oct. 24, 2013, the entire contents of which are incorporated herein by reference.

FIELD OF THE INVENTION

The embodiments discussed herein are related to a technique of relaying data communication.

BACKGROUND OF THE INVENTION

Fiber channel switches have been put into practice for controlling transfer of FC frames by using a fiber channel when a storage system performs communications between a server and a storage. "FC frame" is an abbreviation for fiber channel frame. In the explanations below, an FC frame is also referred to as a frame. Also, a fiber channel switch is also referred to as a relay device.

Receiving transmission data from a server, a relay device refers to the destination included in the received transmission data, and transfers the data to the storage specified by the destination that was referred to.

As another related technique, there is a storage system that includes a storage server and an accelerator server. The storage server returns to the accelerator server whether or not block data is stored in a storage device in accordance with a duplication confirmation request from the accelerator server. Also, a technique is known in which an accelerator server performs either an all-block transmission process, which transmits contents identification data of part of block data to the storage server so as to make a duplication confirmation request and transmit all pieces of block data in accordance with the duplication confirmation result, or a partial block transmission process, which transmits respective pieces of contents identification data to all pieces of block data so as to make a duplication confirmation request and transmit to a storage server block data that is not stored.

Also, as another related technique, there is a data transfer system including a host and an interface unit capable of interfacing with a medium that can be accessed by the host. The interface unit includes a storage unit and a control unit. The storage unit holds data written by the host to the medium or data read from the medium. The control unit omits duplicate data writing when data related to an access to the medium from the host exists in the storage unit. Also, techniques are known in which a control unit omits an operation of reading data from a medium by using data in a storage unit when the data related to an access from a host to a medium exists in the storage unit in the case of data reading (For example, Japanese Laid-open Patent Publication No. 2011-175421 and Japanese Laid-open Patent Publication No. 2006-59201).

However, according to conventional relay devices, when for example a bandwidth for a route between relay devices does not have a margin, an increase in the traffic amount makes communications between the relay devices a bottleneck, sometimes leading to a decrease in communication speeds between the relay devices.

BRIEF SUMMARY OF THE INVENTION

A relay device according to an aspect of the embodiments is a relay device that transfers data from a first device to a second device, and the relay device includes a first storage unit that stores data received from a first device, a second storage unit and a processor. The processor extracts a duplication pattern, which is an identical portion between data stored in the first storage unit in the past and data received currently. Also, the processor executes a process of storing the currently received data in the first storage unit and a process of associating an identifier with the extracted duplication pattern and storing the duplication pattern and the identifier in the second storage unit. Further, the processor edits data into edited data in which a duplication pattern included in the data has been replaced with the identifier associated with the duplication pattern when the data including a duplication pattern stored in the second storage unit has been received from the first device. Then, the processor transfers the edited data to a second device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates an example of setting information;
FIG. 5 illustrates an example of payload information;
FIG. 7 illustrates an example of duplication information;
FIG. 9 illustrates an example of information stored in an extension header;
FIGS. 10A and 10B illustrate examples of an FC frame before edition and the FC frame after edition;
FIG. 13 is a flowchart illustrating a process of a transmission source relay device (second);
FIG. 16 is a flowchart illustrating a process of a transmission destination relay device (second);
FIG. 17 is a flowchart illustrating a process of a transmission destination relay device (third)

DESCRIPTION OF EMBODIMENTS

Explanations will be given for a relay device according to the embodiments.

Figure 1:
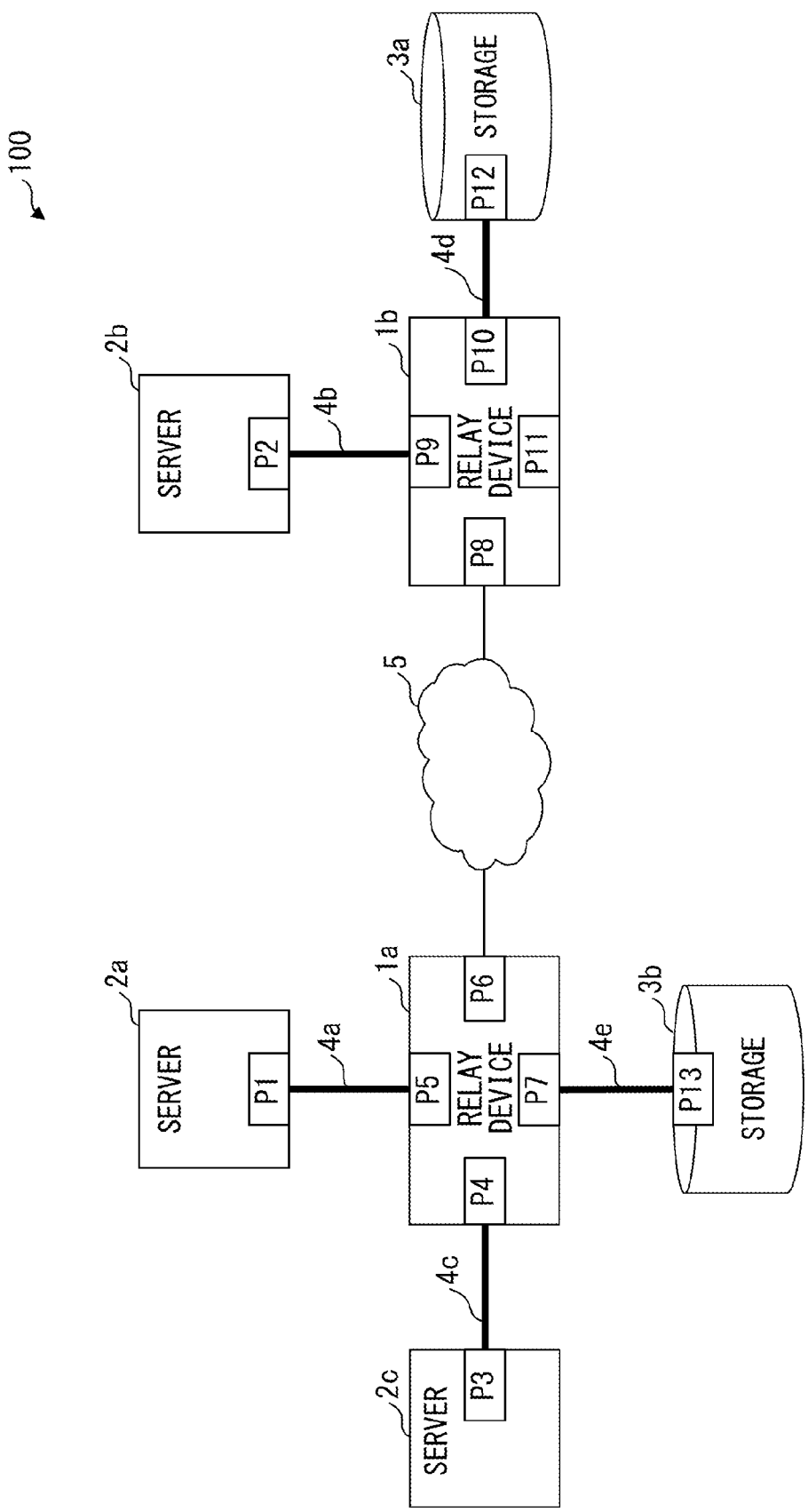
FIG. 1 illustrates an example of a relay system.

FIG. 1 illustrates an example of a relay system.

By referring to FIG. 1, explanations will be given for a relay system used in a storage system.

A relay system 100 includes for example a relay device 1, a server 2, a storage 3, a communication line 4 and a network 5. Also, as illustrated in FIG. 1, the respective devices include ports P1 through P13 for communication connection with the communication line 4 or the network 5. In this example, the communication line 4 is for example a coaxial cable or an optical fiber.

In the relay system 100, the relay device 1 is connected to one or a plurality of servers 2 or storages 3 via the communication line 4. Further, the relay device 1 is connected to the different relay device 1 via the network 5. Also, the connection between the relay device 1 and the different relay device 1 is not limited to the network 5 and may be implemented by the communication line 4.

Explanations will be given for problems of conventional techniques. In the explanations below, the bandwidth of the network 5 is assumed to be smaller than that of the communication line 4.

In the relay system 100, when a frame is to be transmitted from the server 2c to the storage 3a, the frame is transmitted via the communication line 4c, the relay device 1a, the network 5, the relay device 1b and the communication line 4d. Also, as described above, the bandwidth of the network 5 is smaller than that of the communication line 4. Accordingly, the communication speed between the server 2c and the storage 3a depends upon the bandwidth of the network 5. Consequently, in the relay system 100, an increase in the traffic amount of frames transmitted from the server 2c sometimes causes an insufficient bandwidth of the network 5, which works as a bottleneck for the communication speed. Also, in the relay system 100, FCIP (Fibre Channel over IP) may be used for communications in the network 5.

A case is now assumed in which a communication line (not illustrated) is used instead of the network 5 for communications between the relay device 1a and the relay device 1b in the relay system 100. In the explanations below, the bandwidth of communication line 6 is assumed to be same size that of the bandwidth of respective communication line 4.

In the relay system 100, when a frame is transmitted from the server 2c to the storage 3a, the frame is transmitted via the communication line 4c, the relay device 1a, the communication line 6, the relay device 1b and the communication line 4d. Also, in the relay system 100, when a frame is transmitted from a server 2a to the storage 3a, the frame is transmitted via a communication line 4a, the relay device 1a, the communication line 6, the relay device 1b and the communication line 4d. Accordingly, when the frame transmission from the server 2c to the storage 3a and the frame transmission from the server 2a to the storage 3a are performed simultaneously, traffic concentrates in the communication line 6. Also, as described above, the bandwidth of the communication line 6 is roughly the same as that of the communication line 4. Accordingly, in the relay system 100, an increase in the traffic amount of frames transmitted from each server 2 sometimes causes an insufficient bandwidth of the communication line 6, which works as a bottleneck for the communication speed.

Figure 2:
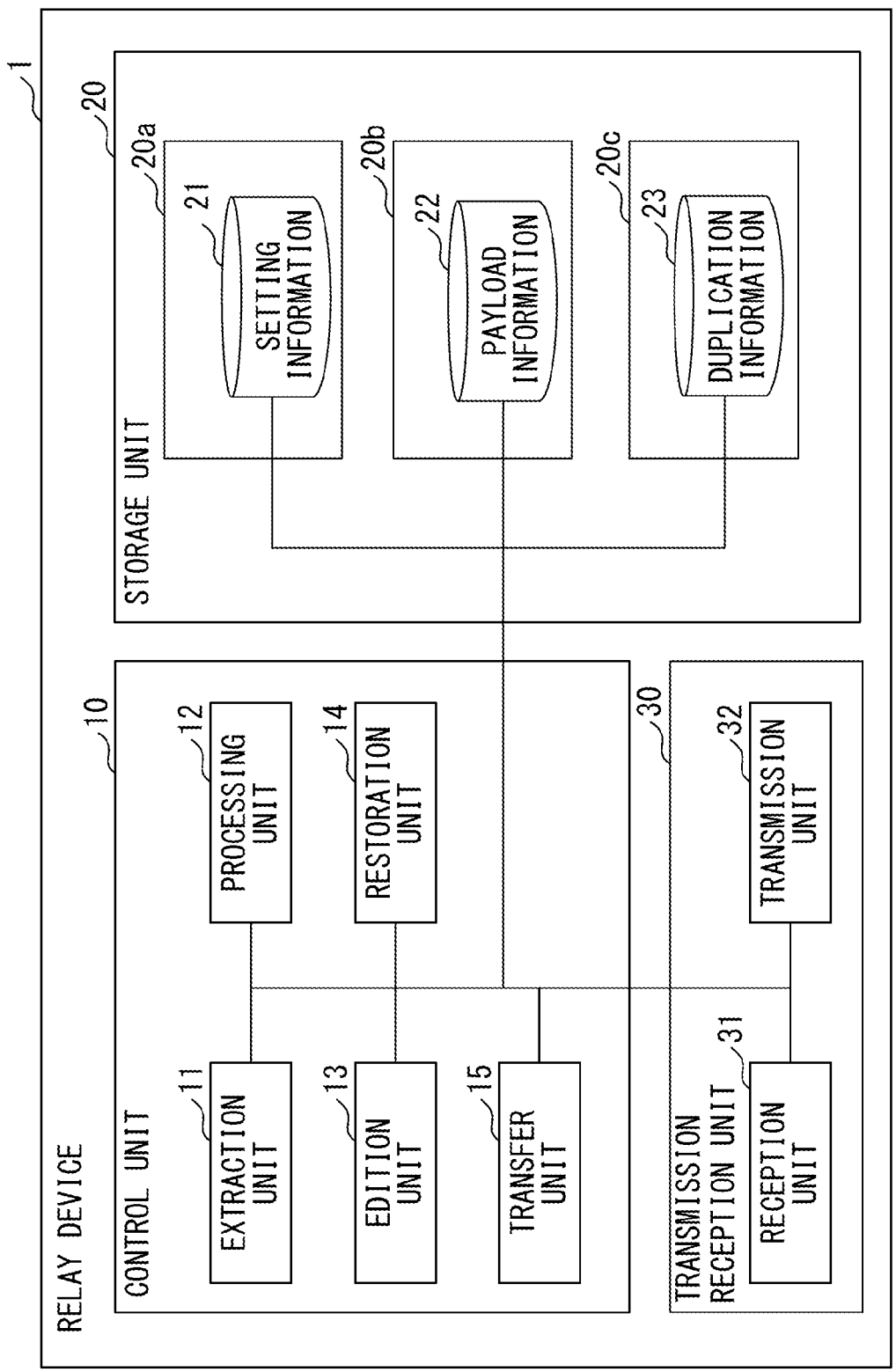
FIG. 2 is a functional block diagram illustrating an example of a relay device.

FIG. 2 is a functional block diagram illustrating an example of a relay device.

Explanations will be given for the relay device 1 by referring to FIG. 2.

The relay device 1 includes for example a control unit 10, a storage unit 20 and a transmission reception unit 30. The relay device 1 is for example a computer, which will be explained later.

The control unit 10 includes an extraction unit 11, a processing unit 12, an edition unit 13, a restoration unit 14 and a transfer unit 15. The storage unit 20 includes a setting information storage unit 20a storing setting information 21, a payload information storage unit 20b (first storage unit) storing payload information 22 and a duplication information storage unit 20c (second storage unit) storing duplication information 23. Also, the transmission reception unit 30 includes a reception unit 31 and a transmission unit 32.

The extraction unit 11 extracts a payload (data) that was stored in the payload information 22 in the past and a duplication pattern, which is a portion identical to a payload included in a frame currently received by the reception unit 31.

Also, the extraction unit 11 extracts a duplication pattern that is equal to or greater than a size leading to a situation where the total of a period of time during which the edition unit 13 edits a payload into edited data and a period of time during which the restoration unit 14 restores the edited data into a payload is shorter than a transfer period of time of duplication pattern. Edited data used herein is data obtained by adding a pattern identifier for identifying a duplication pattern to non-duplication data, which is data other than a duplication pattern included in a payload. Also, edited data may be a data obtained by adding an extension header including a pattern identifier to non-duplication data.

The processing unit 12 performs a process of storing, in payload information, the payload currently received by the reception unit 31. Also, when a duplication pattern has been extracted by the extraction unit 11, the processing unit 12 performs a process of generating a pattern identifier and associating pattern identifier with each duplication pattern so as to store them in the duplication information 23. A pattern identifier used herein is generated in such a manner that a different identifier is added to each duplication pattern stored in the duplication information 23.

Also, when the reception unit 31 has received data including a duplication pattern and a pattern identifier from a transmission source relay device, the processing unit 12 performs a process of associating a duplication pattern and a pattern identifier received by the reception unit 31 and storing them in the duplication information 23. For example, when a duplication pattern and a pattern identifier have been transmitted from the relay device 1a to the relay device 1b, the relay device 1b stores the duplication pattern and the pattern identifier received from the relay device 1a in the duplication information 23 included in the relay device 1b.

Further, when the reception unit 31 has received data including the size of a duplication pattern and position information representing the position where the duplication pattern exists from the relay device 1 as the transmission source, the processing unit 12 obtains a duplication pattern of the size specified by the size of the duplication pattern from the position represented by the position information.

When the reception unit 31 has received a payload including a duplication pattern stored in the duplication information 23 from a transmission source device, the edition unit 13 replaces the duplication pattern included in the payload with a pattern identifier associated with a duplication pattern in the duplication information 23. Also, the edition unit 13 may generate an extension header including a pattern identifier so as to add the generated extension header to a non-duplication data. Thereby, the edition unit 13 edits the payload into edited data including a pattern identifier. Also, a transmission source device is for example the server 2, the storage 3, etc.

When the reception unit 31 has received return data in response to data including the duplication pattern and the pattern identifier that was transmitted to the relay device 1 as the transmission destination, the edition unit 13 starts the use of the transmitted duplication pattern and pattern identifier for the edition process.

When for example the number of times of detection of duplication patterns stored in the duplication information 23 has become equal to or greater than a threshold, the transfer unit 15 controls the transmission unit 32 and makes the transmission unit 32 transmit, to the relay device 1 as a transmission source, request data including duplication pattern to which a pattern identifier etc. has been added.

Also, when the reception unit 31 has received return data in response to the transmitted request data, the edition unit 13 starts the use of the transmitted duplication pattern and pattern identifier for the edition process. In other words, when return data has been received in response to request data, the edition unit 13 determines that information of the duplication information 23 transmitted to the transmission source relay device 1 was stored and the duplication information 23 between relay devices were synchronized.

Request data may be for example data that requests writing to the storage 3 from the server 2 or data that requests reading. Return data may be for example data that reports writing completion transmitted from the transmission destination storage 3 or the transmission destination relay device 1 when request data is a write request. When request data is a write request, for example a status frame transmitted from the transmission destination storage 3 may be used as return data. Also, return data may be for example data that reports reading completion transmitted from the transmission destination storage 3 or the transmission destination relay device 1 when request data is a read request.

Also, when the edition unit 13 replaces a duplication pattern with a pattern identifier, the edition unit 13 includes, in edited data, position information representing the position of the duplication pattern in the payload. Position information used herein may be for example offset information representing the number of the bit counting from the top of the payload that the duplication pattern exists in.

Further, when the edition unit 13 performs the edition process, the edition unit 13 makes a search in order to confirm whether or not a duplication pattern is included in the payload in the order starting from a duplication pattern that is used in the edition process highly frequently. Also, when the duplication information 23 has been stored in a buffer, the processing unit 12 may perform the process of arranging duplication patterns stored in the duplication information 23 in the order starting from a duplication pattern that is used in the edition process by the edition unit 13 highly frequently. Also, when the duplication information 23 has been stored in a buffer, the edition unit 13 may make a search in order to confirm whether or not a duplication pattern is included in a payload in the order starting from the duplication pattern stored at the top of the buffer. Thereby, the edition unit 13 may make a search in order to confirm whether or not a duplication pattern is included in a payload in the order starting from a duplication pattern that is used by the edition process highly frequently.

When the edition unit 13 makes a search in order to confirm whether or not a duplication pattern is included in a payload, the edition unit 13 may terminate the search process when a duplication pattern has been detected, and may perform an edition process by using the detected duplication pattern. Hereinbelow, explanations will be given on the basis of an assumption that the edition unit 13 terminates the search process when a duplication pattern has been detected.

However, the edition unit 13 may also perform an edition process by detecting a plurality of duplication patterns included in a payload and using the duplication pattern of the greatest size. Also, the edition unit 13 may perform the edition process by detecting a plurality of duplication patterns included in a payload and using all the duplication patterns.

When the reception unit 31 has received edited data including an identifier stored in the duplication information 23 from the transmission source relay device 1, the restoration unit 14 performs a process of replacing the pattern identifier included in the edited data with a duplication pattern associated with the pattern identifier. Thereby, the restoration unit 14 restores the original data before the edition from the edited data.

Also, when the reception unit 31 has received return data in response to data that was transmitted to a transmission destination device, the restoration unit 14 starts the use of the duplication pattern and the pattern identifier added to that data in a restoration process.

For example, the reception unit 31 receives, from the transmission source relay device 1, request data including a duplication pattern to which a pattern identifier, the size of a duplication pattern, position information, etc. have been added. Then, the processing unit 12 obtains data the size of the duplication pattern from the position represented by the position information in the payload, associates the data with a pattern identifier and stores the pattern identifier and the data as a duplication pattern in the duplication information 23. Further, the transfer unit 15 transmits the request data received by the reception unit 31 to the transmission source device. Thereafter, when the reception unit 31 has received return data in response to the request data transmitted from the transmission source device, the restoration unit 14 starts the use of the duplication pattern and pattern identifier stored in the duplication information 23 in a restoration process.

Further, the restoration unit 14 inserts a duplication pattern to the position represented by the position information when the restoration unit 14 replaces the pattern identifier included in the edited data with a duplication pattern.

The transfer unit 15 controls the transmission unit 32 so as to make the transmission unit 32 transfer data edited by the edition unit 13 to the transmission destination relay device 1, and further makes the transmission unit 32 transfer data restored by the restoration unit 14 to the transmission destination device.

Also, the transfer unit 15 controls the transmission unit 32 so as to make the transmission unit 32 transmit data including a duplication pattern extracted by the extraction unit 11 and a pattern identifier associated with a duplication pattern by the processing unit 12 to the transmission destination relay device 1. For this process, the transfer unit 15 may control the transmission unit 32 so as to make the transmission unit 32 transmit the data including a pattern identifier, the size of a duplication pattern and position information representing the position of the duplication pattern and the duplication pattern to the transmission destination relay device 1 from the transmission source relay device 1.

As illustrated in FIG. 3, the setting information includes payload storage threshold, size threshold, number-of-times-of-detection threshold and duplication storage threshold. Also, values stored in the payload information 22 illustrated in FIG. 3 are examples and may be set appropriately in accordance with the processing capacity of the relay device 1 or the bandwidths of the communication line 4 and the network 5.

A payload storage threshold represents the upper limit value of the number of payloads stored in the payload information 22. The processing unit 12 deletes a prescribed payload when for example a payload is to be stored in the payload information 22 in a situation where a number of payloads equal to or greater than a payload storage threshold stored in the payload information 22 has been stored in the payload information 22. A prescribed payload may be for example the first payload among payloads stored in the payload information 22. Also, a prescribed payload may be the duplication pattern that was first stored in the duplication information 23 among payloads for which duplication patterns are extracted by the extraction unit 11 with low frequency (for example the three payloads with the lowest values of frequency etc.).

A size threshold represents the minimum size of a duplication pattern to be extracted by the extraction unit 11. When for example the extraction unit 11 extracts a duplication pattern from a payload, the extraction unit 11 extracts a duplication pattern of a size equal to or greater than a size threshold. A size threshold is set for example in such a manner that the total of a period of time during which the edition unit 13 edits a payload into edited data and a period of time during which the restoration unit 14 restores the edited data into a payload is shorter than a transfer period of time of duplication pattern. In other words, a size threshold is set in order to prevent a situation where a short duplication pattern replaced by the edition unit 13 with a pattern identifier leads to a period of time for performing an edition process and a restoration process that is longer than a period of time for transferring the duplication pattern as it is, reducing the communication speed.

A number-of-times-of-detection threshold is information representing the number of times of the extraction of the same duplication pattern by the extraction unit 11 that triggers the use of that duplication pattern for an edition process and a restoration process. A number-of-times-of-detection threshold is set so that the edition unit 13 uses a duplication pattern having a high possibility of duplicating selectively in an edition process and a restoration process. For example, when the extraction unit 11 has extracted the same duplication pattern three times with the number-of-times-of-detection threshold having been set to be three, the edition unit 13 uses that duplication pattern in an edition process. Thereby, the edition unit 13 can omit identity determination for duplication patterns with a low possibility of being duplicating so as to increase the efficiency of identity determination between a duplication pattern to be included in a payload and a duplication pattern to be included in the duplication information 23.

A duplication storage threshold represents the upper limit value of the number of duplication patterns stored in the duplication information 23. A duplication storage threshold is set in order to avoid a situation where all duplication patterns extracted by the extraction unit 11 are stored and the number of duplication patterns stored in the duplication information 23 becomes immense. For example, the processing unit 12 deletes a record storing a prescribed duplication pattern when a duplication pattern is to be stored in the duplication information 23 in a situation where a number of duplication patterns equal to a duplication storage threshold have been stored in the duplication information 23. A prescribed duplication pattern to be deleted may be for example the duplication pattern that was first stored in the duplication information 23 among duplication patterns for which detection frequency in identity determination is low (for example the three duplication patterns with the lowest values of frequency etc.).

Figure 4:
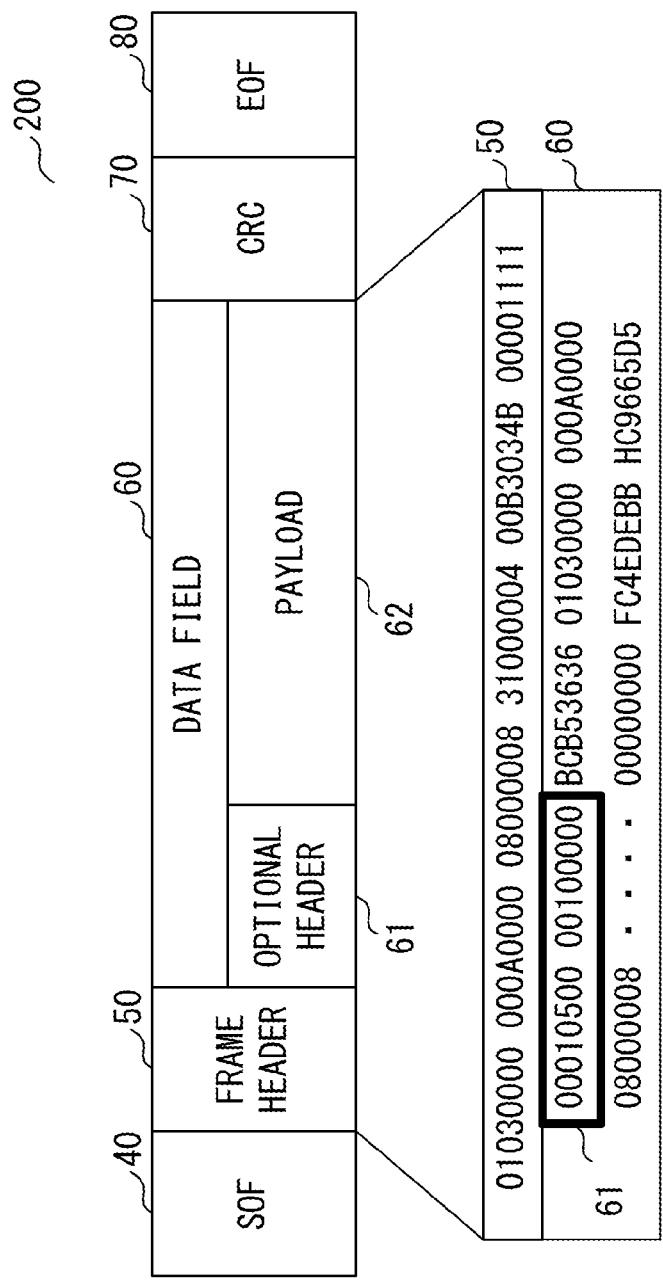
FIG. 4 illustrates an example of an FC frame.

FIG. 4 illustrates an example of an FC frame.

Explanations will be given for a frame structure of an FC frame 200 by referring to FIG. 4. In the explanations below, a frame structure of the FC frame 200 will be explained as an example of a frame transferred in the embodiment. However, the application of the relay device 1 of the embodiment is not limited to an FC frame but the relay device 1 of the present embodiment may be applied to other data including an optional header 61 (extension header) and a payload 62 (data).

The FC frame 200 includes an SOF 40, a frame header 50, a data field 60, a CRC 70 and an EOF 80. In the explanations below, the FC frame 200 may also be referred to as the frame 200.

The SOF 40 is a field that represents the start of the frame 200.

The frame header 50 is a field including for example the address of a transmission source device and the address of a transmission destination device. The frame header 50 is also a field including an identifier representing exchange (transaction) for which the frame 200 is used. The address of a transmission source device may be for example the port identifier (SID: Source ID) of the relay device 1 connected to the transmission source device of the frame 200. The address of a transmission destination device may be for example the port identifier (DID: Destination ID) of the relay device 1 connected to the transmission destination device of the frame 200. Also, an identifier representing exchange for which the frame 200 is used may be for example an OXID (Originator Exchange ID).

The data field 60 is a field including the optional header 61 and the payload 62.

The optional header 61 is for example a field that stores an option added to the frame 200. Also, the optional header 61 does not have to be added to the FC frame 200 when for example there are no options. Accordingly, the data field 60 is variable in length. The optional header 61 of the embodiment stores for example a pattern identifier, position information, and the size of a duplication pattern. In the explanations below, the optional header 61 may also be referred to as an extension header.

The payload 62 is a field that stores data to be transmitted from a transmission source device to a transmission destination device. The payload 62 is a variable length field, which changes in size in accordance with the size of for example data to be transmitted.

The CRC 70 is a field that stores a sign used for extraction of an error of the frame 200. The relay device 1 executes error checks of the FC frame 200 by using a sign stored in the CRC 70 after restoring edited data into the original data when for example the relay device 1 received the edited data from the transmission source relay device 1.

The EOF 80 is a field that represents the end of the frame 200.

FIG. 5 illustrates an example of payload information.

By referring to FIG. 5, explanations will be given for the payload information 22.

By using the payload storage threshold of the setting information 21 as an upper limit, the payload information 22 stores payload 62 included in the frame received by the reception unit 31.

Figure 6:
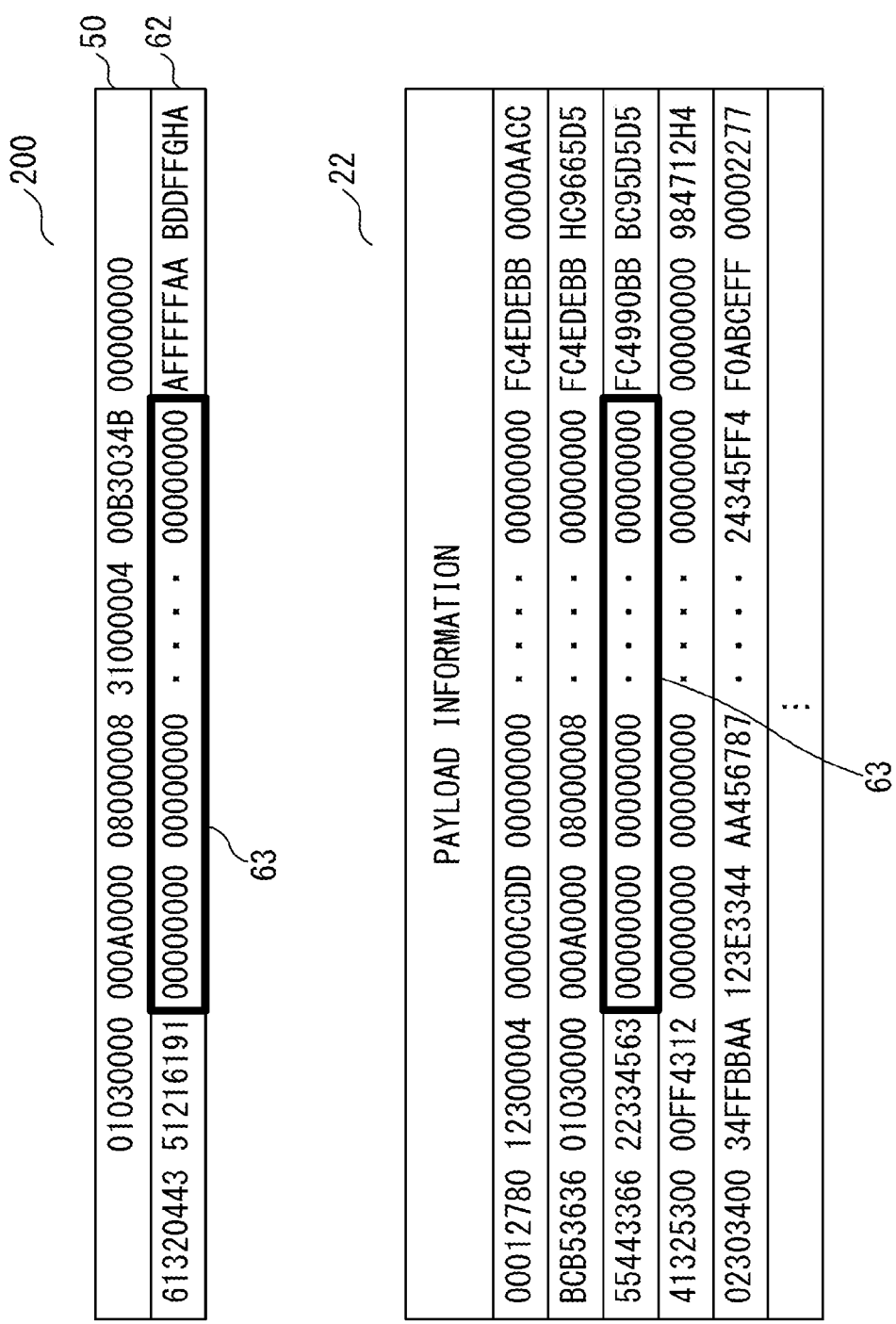
FIG. 6 explains an extraction process of a duplication pattern.

FIG. 6 explains an extraction process of a duplication pattern.

By referring to FIG. 6, an extraction process of a duplication pattern performed by the extraction unit 11 will be explained.

When the reception unit 31 has received the frame 200, the extraction unit 11 searches for an identical portion between the payload 62 included in the FC frame 200 and each payload stored in the payload information 22. When, an identical portion of a size equal to or greater than a size threshold stored in the setting information 21 has been detected, that identical portion is extracted as a duplication pattern 63, which is denoted by the thick-line box.

When for example the payload information 22 has been stored in a buffer, the processing unit 12 may perform a process of arranging each payload stored in the payload information 22 from the top of the storage area in the order of the frequency with which a search is made for a portion identical to a payload included in the frame 200. In this process, when the extraction unit 11 searches for an identical portion between the payload 62 stored in the FC frame 200 and each payload stored in the payload information 22, the extraction unit 11 may perform identity determination in the order starting from the top of a storage area of a buffer. Thereby, the extraction unit 11 determines whether or not there is an identical portion in each payload stored in the payload information 22 in the order starting from the highest frequency with which a search is made for a portion identical to a payload included in the frame 200, making it possible to improve the efficiency in the extraction of duplication patterns.

Also, when the extraction unit 11 extracted a plurality of duplication patterns of the payload 62 from the payload information 22, the extraction unit 11 may extract the first extracted duplication pattern as a duplication pattern. In such a case, the extraction unit 11 terminates the extraction process when the extraction unit 11 has extracted the first duplication pattern, making it possible to improve the extraction efficiency. In the following explanations, explanations will be given on an assumption that the first duplication pattern detected by the extraction unit 11 is extracted as a duplication pattern.

However, when the extraction unit 11 has extracted a plurality of duplication patterns of the payload 62 from the payload information 22, the extraction unit 11 may extract the duplication pattern of the greatest size as a duplication pattern. Also, when the extraction unit 11 has extracted a plurality of duplication patterns of the payload 62 from the payload information 22, the extraction unit 11 may extract all of the duplication patterns as duplication patterns.

FIG. 7 illustrates an example of duplication information.

By referring to FIG. 7, an example of information stored in the duplication information 23 is explained.

The duplication information 23 includes pattern identifier, detection frequency, duplication pattern, size, use condition, the number of times of detection, OXID, PID and DID.

A pattern identifier is information for identifying a duplication pattern. A pattern identifier is generated by the processing unit 12 when the extraction unit 11 extracted a new duplication pattern that is not stored in the duplication information 23. Then, the pattern identifier is associated by the processing unit 12 with the duplication pattern extracted by the extraction unit 11 and is stored in the duplication information 23.

Detection frequency is information representing frequency with which it is detected that a duplication pattern is included in a payload when a search is made by the edition unit 13 confirm whether or not a duplication pattern stored in the duplication information 23 is included in a payload. The processing unit 12 for example may calculate how many times it was detected that a duplication pattern stored in the duplication information 23 is included in a payload within a prescribed period of time so as to uses the calculation result as detection frequency. Thereafter, the processing unit 12 associates detection frequency with each duplication pattern stored in the duplication information 23 and stores the detection frequency.

Also, when for example a duplication pattern has been stored in a buffer, the processing unit 12 may perform a process of arranging respective duplication patterns stored in the duplication information 23 in the order of detection frequency starting from the top of a storage area of the buffer. Also, when the edition unit 13 makes a search in order to confirm whether or not a payload included in a received frame includes a duplication pattern stored in the duplication information 23, the edition unit 13 may make a search sequentially from the first duplication pattern stored in the buffer. Thereby, the edition unit 13 makes a search in order to confirm whether or not a duplication pattern is included in a payload in the order starting from a duplication pattern with high detection frequency, making it possible to enhance the efficiency in the search for a duplication pattern included in a payload.

A duplication pattern is a duplication pattern extracted by the extraction unit 11.

A size is information representing the size of the associated duplication pattern. In the explanations below, the unit of size is assumed to be for example bytes.

A use condition is information representing a use condition of a duplication pattern. "Effective" represents that a duplication pattern is used in an edition process or a restoration process. "New" represents that the number of times of the detection of identity with a duplication pattern extracted by the extraction unit 11 has become the same number as a number-of-times-of-detection threshold and the synchronization process of the duplication information 23 with the transmission destination relay device 1 is being executed. "Detected" represents that the number of times of the detection of identity with a duplication pattern extracted by the extraction unit 11 is smaller than a number-of-times-of-detection threshold and the transmission destination relay device 1 is waiting for a synchronization process of the duplication information 23.

A number of times of detection represents the number of times that identity was detected between a duplication pattern stored in a record and a duplication pattern extracted by the extraction unit 11. Also, as illustrated in FIG. 7, when the number-of-times-of-detection threshold stored in the setting information 21 is 3, the number of times of detection may be a value up to three.

Figure 8:
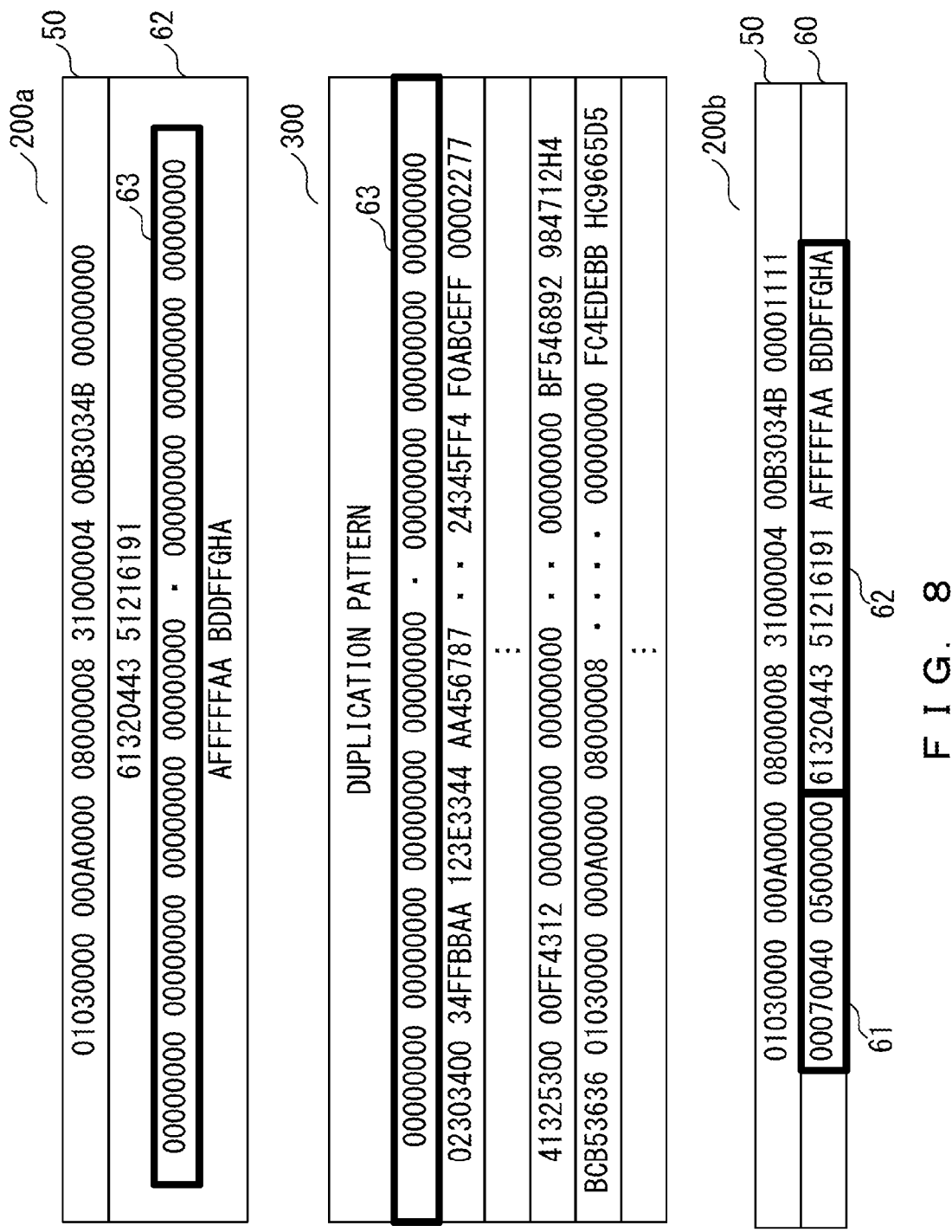
FIG. 8 explains an edition process and a restoration process of data.

FIG. 8 explains an edition process and a restoration process of data.

By referring to FIG. 8, explanations will be given for an edition process of data performed by the edition unit and a restoration process of data performed by the restoration unit 14.

First, an edition process of data performed by the edition unit 13 will be explained.

When the edition unit 13 has received a frame 200a illustrated in FIG. 8, the edition unit 13 makes a search in order to confirm whether or not the payload 62 included in the frame 200a is partially or entirely identical to each duplication pattern included in a duplication pattern field 300 stored in the duplication information 23. When the edition unit 13 has detected a portion identical to part of the payload 62 as illustrated in FIG. 8, the edition unit 13 obtains the pattern identifier and the size associated with the identical duplication pattern 63 from the duplication information 23. The edition unit 13 also generates position information representing the position of the duplication pattern 63 in the payload 62. Further, the edition unit 13 generates the extension header 61 including the pattern identifier and the size obtained from the duplication information 23 and the position information of the duplication pattern 63. The pattern identifier and the size and position information are illustrated in header information 400 illustrated in FIG. 9. Then, the edition unit 13 adds the generated extension header 61 to the payload 62 from which the data of the portion corresponding to the duplication pattern 63 has been deleted (non-duplication data). Thereby, the edition unit 13 generates the edited data 60 as a result of adding an extension header 61 to non-duplication data.

The edition unit 13 edits for example the frame 200a before edition illustrated in FIG. 10A into a frame 200b after edition illustrated in FIG. 10B. For this editing, the edition unit 13 makes the size of the payload 62 smaller by 1280 bytes when for example the duplication pattern 63 illustrated in FIG. 10A is a duplication pattern associated with pattern identifier "0007" in the duplication information 23 illustrated in FIG. 7. Thereby, the edition unit 13 for example makes the size of a frame smaller by 1216 bytes by editing data into edited data when the extension header 61 is of 64 bytes. Also, the edited data 60 is data obtained by adding the extension header 61 illustrated in FIG. 10B and the payload 62 (non-duplication data) to each other.

Next, explanations will be given for a restoration process of data performed by the restoration unit 14.

When the restoration unit 14 has received the frame 200b including the edited data 60 obtained by adding an extension header 61 to the payload 62 from which duplication has been deleted as illustrated in FIG. 8, the restoration unit 14 obtains a pattern identifier and position information included in the extension header 61. Then, the restoration unit 14 obtains a duplication pattern 63 associated with the pattern identifier from the duplication information 23. Further, the restoration unit 14 inserts the obtained duplication pattern 63 into a position represented by the position information. Thereby, the restoration unit 14 restores the payload 62 before the edition included in the frame 200a from the edited data 60.

Figure 11:
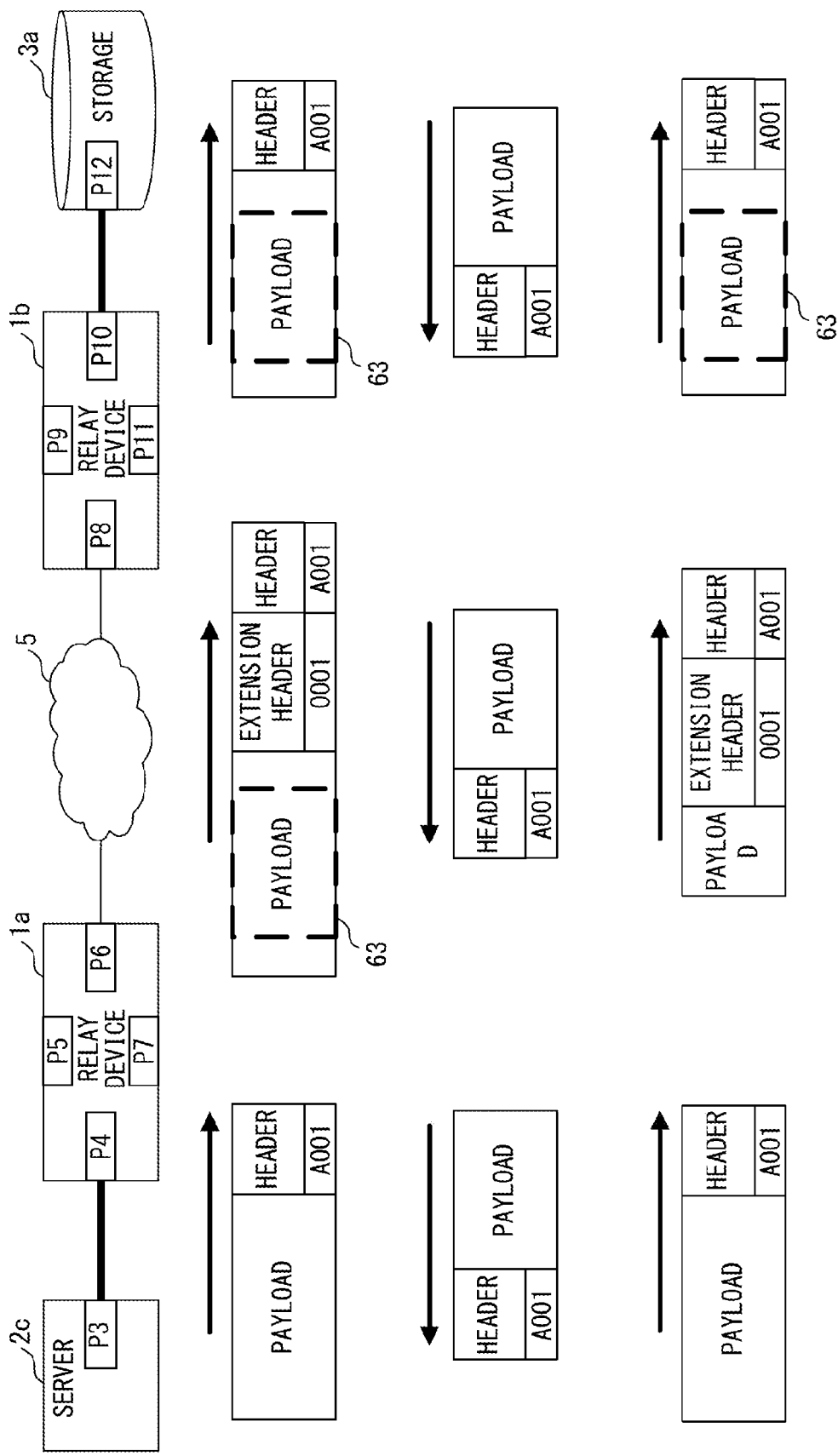
FIG. 11 illustrates an example of a synchronization process of duplication information.

FIG. 11 illustrates an example of a synchronization process of duplication information.

Explanations will be given for a synchronization process of the duplication information 23 by referring to FIG. 11.

In the explanations below, a case is described where a process of transmitting a write request from the server 2c to the storage 3a and of writing information to the storage 3a is executed. Also, for the sake of simplicity of explanations, configurations other than those of a header, an extension header and a payload are omitted in the explanations of a frame.

As illustrated in the frame of the first stage of FIG. 11, the server 2c (a transmission source device) transmits to the relay device 1a (a transmission source relay device) a payload (frame) to which a header including an OXID "A001" has been added. It is assumed that this header further includes an SID and a DID although they are not illustrated. In the explanations below, an OXID, an SID and a DID are also referred to as a frame identifier.

The relay device 1a receives from the server 2c a payload to which a header has been added. When the duplication pattern 63 depicted by the thick-line box exists, which has the same number of times of detection as a number-of-times-of-detection threshold in a received payload, the relay device 1a generates an extension header including a pattern identifier and a size associated with the duplication pattern 63 and position information of the duplication pattern 63. Also, the relay device 1a adds the generated extension header to the payload. In this process, the relay device 1a updates the use condition associated with the duplication pattern 63 stored in the duplication information 23 included in the relay device 1a to "new" from "detected". Further, the relay device 1a associates a frame identifier included in the header added to the payload with the duplication pattern 63 and stores the frame identifier and the duplication pattern 63 in the duplication information 23.

Then, the relay device 1a transmits a payload to which an extension header has been added, to the relay device 1b (a transmission destination relay device) via the network 5 without replacing the duplication pattern 63 with a pattern identifier.

When the relay device 1b has received a payload to which an extension header has been added, the relay device 1b obtains the pattern identifier and the size and the position information of the duplication pattern 63, included in the extension header. Then, the relay device 1b obtains data of the obtained size of the duplication pattern 63 from the position of the data of the payload represented by the obtained position information. Also, the relay device 1b associates the obtained pattern identifier with the obtained data as the duplication pattern 63 and stores the data and the pattern identifier in the duplication information 23 included in the relay device 1b. Further, the relay device 1b associates the frame identifier included in the header that was added to the payload with the duplication pattern 63 and stores the frame identifier and the duplication pattern 63 in the duplication information 23 included in the relay device 1b. In this process, the relay device 1b updates the use condition associated with the duplication pattern 63 stored in the duplication information 23 included in the relay device 1b to "new".

Further, the relay device 1b deletes the extension header 61 and transmits the payload to which the header has been added, to the storage 3a (a transmission destination device).

As illustrated in the frame of the second stage of FIG. 11, when the relay device 1b has received a return data to which a header has been added from the storage 3a, the relay device 1b obtains a frame identifier stored in the header. Then, the relay device 1b searches for the same frame identifier as the obtained frame identifier from among frame identifiers associated with the duplication pattern 63 stored in the duplication information 23 included in the relay device 1b. When the same frame identifier as the obtained frame identifier exists among frame identifiers associated with the duplication pattern 63, the relay device 1b updates the use condition associated with that frame identifier from "new" to "effective". Thereby, the relay device 1b starts the use of the duplication pattern 63 associated with a frame identifier whose use condition is "effective" in an edition process and a restoration process.

Then, the relay device 1b transmits the returned data, received from the storage 3, to which a header has been added, to the relay device 1a via the network 5.

When the relay device 1a has received a return data to which a header has been added from the relay device 1b, the relay device 1a obtains a frame identifier stored in the header. Then, the relay device 1a searches for the same frame identifier as the obtained frame identifier from among frame identifiers associated with the duplication pattern 63 stored in the duplication information 23 included in the relay device 1a. When the same frame identifier as the obtained frame identifier exists among frame identifiers associated with the duplication pattern 63, the relay device 1a updates the use condition associated with that frame identifier from "new" to "effective". Thereby, the relay device 1a starts the use of the duplication pattern 63 associated with a frame identifier whose use condition is "effective" in an edition process and a restoration process. Thereby, the duplication patterns 63 used for edition processes and restoration processes are synchronized between the relay device 1a and the relay device 1b.

Then, the relay device 1a transmits the returned data, received from the storage 3a, to which a header has been added, to the server 2c.

Thereafter, as illustrated in the frame of the third stage of FIG. 11, when the relay device 1a has received a payload including the duplication pattern 63 to which a header has been added from the server 2c, the relay device 1a replaces the duplication pattern 63 included in the duplication pattern 63 with the associated pattern identifier and stores it in the extension header. Then, the relay device 1a generates edited data obtained by adding an extension header to a payload from which duplication has been deleted and transmits the generated edited data to the relay device 1b via the network 5.

When the relay device 1b has received the edited data, the relay device 1b obtains the duplication pattern 63 associated with the pattern identifier included in the extension header from the duplication information 23 included in the relay device 1b. Further, the relay device 1b inserts the obtained duplication pattern 63 to the position represented by the position information in the extension header. Thereby, the relay device 1b restores data from edited data.

Then, the relay device 1b transmits the restored data to the storage 3.

Figure 12:
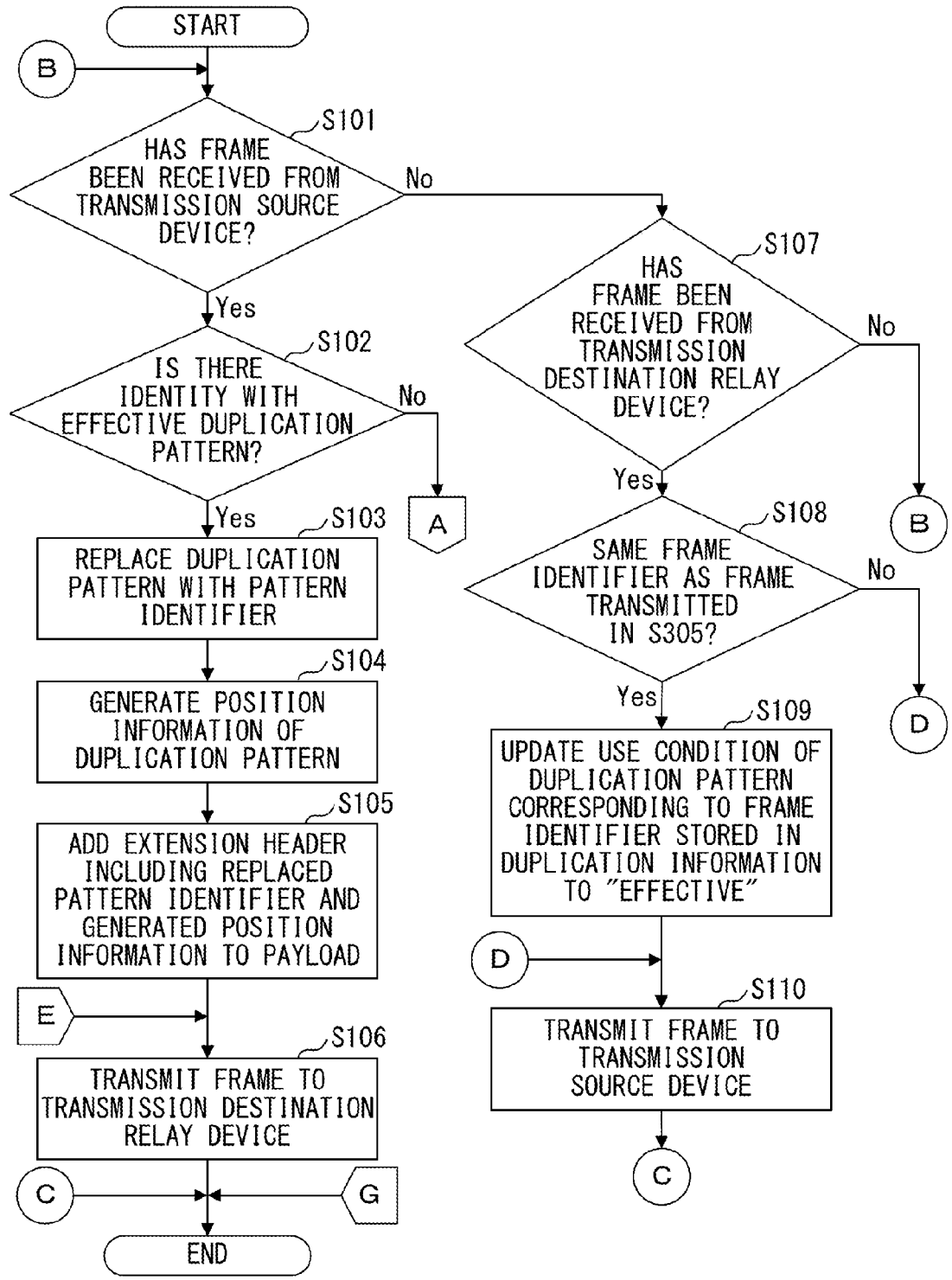
FIG. 12 is a flowchart illustrating a process of a transmission source relay device (first)
Figure 14:
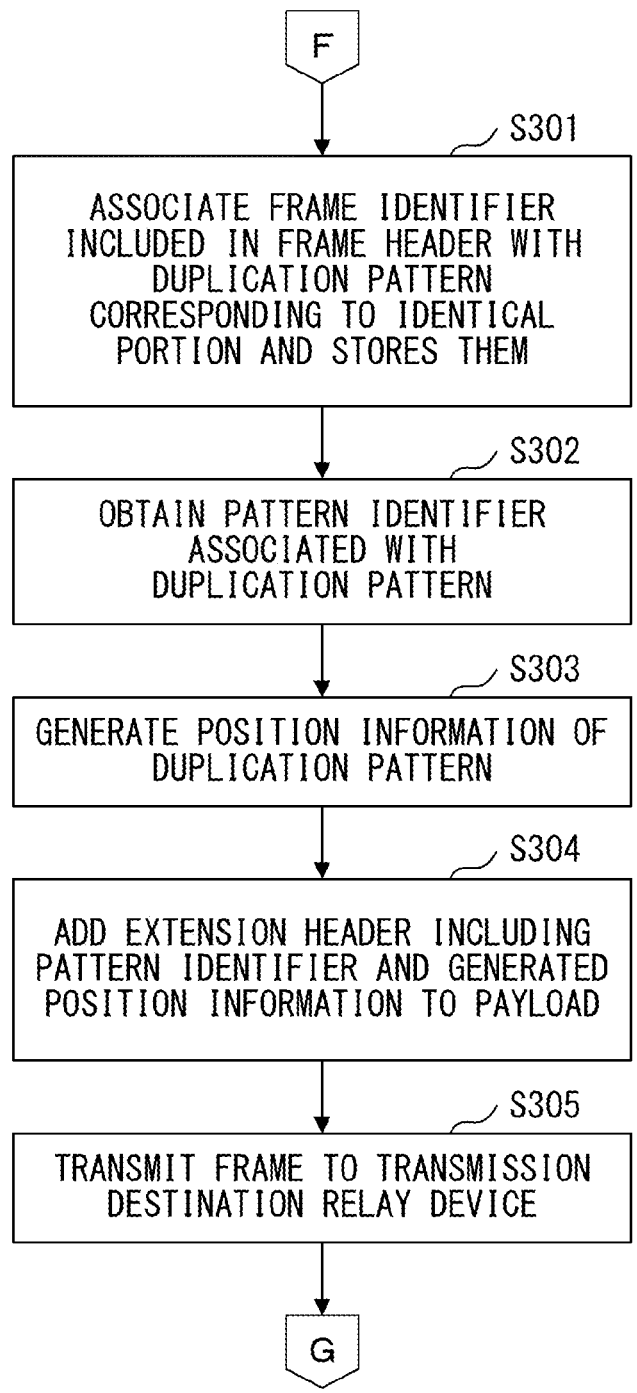
FIG. 14 is a flowchart illustrating a process of a transmission source relay device (third)

FIG. 12 through FIG. 14 are flowcharts illustrating processes of a transmission source relay device.

By referring to FIG. 12 through FIG. 14, explanations will be given for a process performed when the relay device 1 illustrated in FIG. 2 is used as a transmission source device. In the explanations below, it is assumed that when a pattern identifier is stored in an extension header, position information representing the position, in the payload, of the duplication pattern specified by the pattern identifier is also stored.

FIG. 12 is referred to for an explanation.

The processing unit 12 determines whether or not the reception unit 31 has received a frame from a transmission source device (S101). When the processing unit 12 has received a frame from a transmission source device (Yes in S101), the processing unit 12 makes a search in order to confirm whether or not a payload of data of a pattern identical to each duplication pattern whose use condition is "effective" is included in duplication patterns stored in the duplication information 23 (S102).

When the processing unit 12 has detected a duplication pattern whose use condition is "effective" from a payload (Yes in S102), the edition unit 13 replaces a duplication pattern included in the payload with a pattern identifier associated with the duplication pattern (S103).

Further, the edition unit 13 generates position information representing the position of the data corresponding to the duplication pattern in the payload (S104).

Then, the edition unit 13 generates an extension header including the pattern identifier that replaced the duplication pattern and generated position information and adds the extension header to data from which the data of the portion corresponding to the duplication pattern has been deleted (S105). Thereby, the edition unit 13 edits the payload into edited data.

The transfer unit 15 controls the transmission unit 32 and makes the transmission unit 32 transmit a frame to the transmission destination relay device 1 (S106). Then, the relay device 1 terminates the process. Also, when the transfer unit 15 executes S106 subsequently to the process of S105, the transfer unit 15 controls the transmission unit and makes the transmission unit 32 transmit a frame including edited data to the relay device 1. When the transfer unit 15 executes the process of S106 subsequently to the processes of S203 and S206, the transfer unit 15 controls the transmission unit 32 and makes the transmission unit 32 transmit to the relay device 1 the frame received from the transmission source device in S101.

FIG. 13 is referred to so as to give an explanation.

When in S102 the processing unit 12 has determined that a payload does not include a duplication pattern whose use condition is "effective" (No in S102), the processing unit 12 stores the payload included in the frame in the payload information 22 (S201).

Then, the processing unit 12 searches for an identical portion between a payload included in a frame received by the reception unit 31 and a payload stored in the payload information 22 (S202). Identity used herein includes partial identity and complete identity between for example a payload included in a frame received by the reception unit 31 and a payload stored in the payload information 22. Also, an identical portion has a size equal to or greater than for example a size stored in the setting information 21.

When there is an identical portion between a payload included in a frame received by the reception unit 31 and a payload stored in the payload information 22 (Yes in S203), the processing unit 12 determines whether or not the same duplication pattern as that identical portion is stored in the duplication information 23 (S204).

When the same duplication pattern with the identical portion is stored in the duplication information 23 (Yes in S204), the processing unit 12 increments the number of times of detection associated with the same duplication pattern as the identical portion (S205).

Also, the processing unit 12 determines whether or not the number of times of detection associated with the same duplication pattern as the identical portion is equal to or greater than a setting information threshold.

When the number of times of detection associated with the duplication pattern is equal to or greater than a setting information threshold (Yes in S206), the processing unit 12 updates the use condition associated with the same duplication pattern as the identical portion to "new" (S207).

By referring to FIG. 14, an explanation will be given.

The processing unit 12 associates the same duplication pattern as the identical portion with a frame identifier included in the frame received in S101 and stores the frame identifier and the duplication pattern (S301).

Then, the edition unit 13 obtains the pattern identifier associated with the duplication pattern from the duplication information 23 (S302).

Also, the edition unit 13 generates position information representing the position of data corresponding to a duplication pattern in the payload (S303).

Further, the edition unit 13 generates an extension header including the obtained pattern identifier and the generated position information, and adds the generated extension header to the payload (S304).

The transfer unit 15 controls the transmission unit and makes the transmission unit 32 transmit a frame including the payload to which the extension header has been added, to a transfer destination relay device (S305). Then, the relay device 1 terminates the process.

By referring to FIG. 12, an explanation will be given.

When the processing unit 12 does not receive a frame from a transmission source device in S101 (No in S101), the processing unit 12 determines whether or not the reception unit 31 has received a frame from the transmission destination relay device 1 (S107).

When the reception unit 31 does not receive a frame from the transmission destination relay device 1 (No in S107), the processing unit 12 executes the process of S101. In other words, the processing unit 12 waits for a frame to be received.

When the reception unit 31 has received a frame from the transmission destination relay device 1 (Yes in S107), the processing unit 12 determines whether or not the frame received from the transmission destination relay device 1 includes the same frame identifier as that of the frame transmitted in S305 (S108).

When the frame received from the transmission destination relay device 1 includes the same frame identifier as that of the frame transmitted in S305 (Yes in S108), the processing unit 12 updates the use condition of the duplication pattern corresponding to the frame identifier stored in the duplication information 23 to "effective" (S109).

The transfer unit 15 transmits a frame received from the transmission destination relay device 1 to a transmission source device (S110). Then, the relay device 1 terminates the process.

When, in S108, the frame received from the transmission destination relay device 1 does not include the same frame identifier as that of the frame transmitted in S305 (No in S108), the processing unit 12 executes the process of S110. Then, the relay device 1 terminates the process.

By referring to FIG. 13, an explanation will be given.

When, in S203, there are no identical portion between a payload included in a frame received by the reception unit 31 and a payload stored in the payload information 22 (No in S203), the processing unit 12 executes the process of S106. Then, the relay device 1 terminates the process.

When, in S204, the same duplication pattern as the identical portion is not stored in the duplication information 23 (No in S204), the processing unit 12 stores the identical portion as a duplication pattern in the duplication information 23 (S208).

Also, the processing unit 12 generates a pattern identifier that is different from a duplication pattern stored in the duplication information 23 (S209).

Then, the processing unit 12 associates the duplication pattern stored in the duplication information 23 in S208 with the generated pattern identifier and stores the pattern identifier and the duplication pattern (S210).

Further, the processing unit 12 updates the use condition of the duplication pattern stored in the duplication information 23 in S208 to "detected" (S211), and executes the process of S206.

Figure 15:
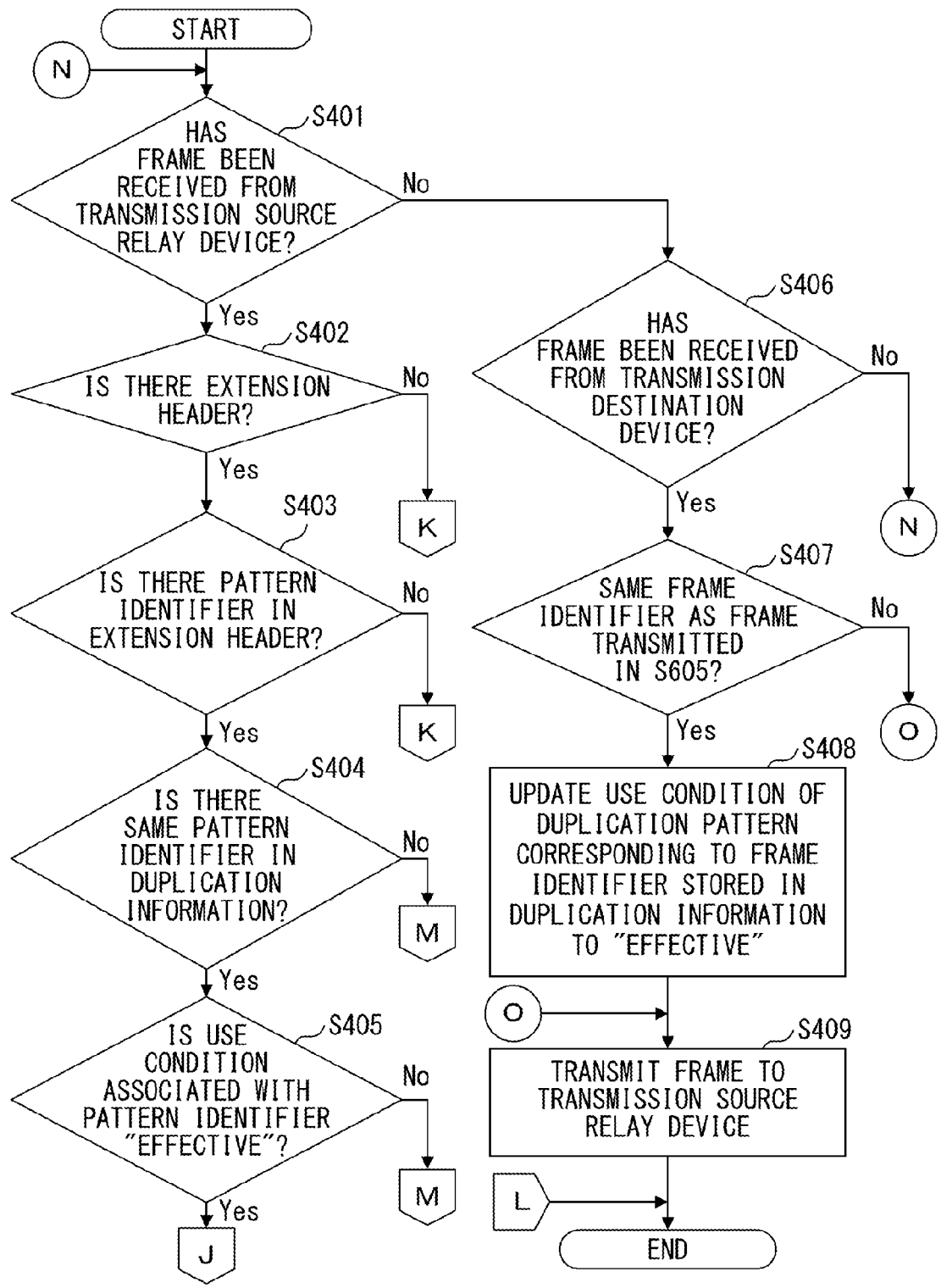
FIG. 15 is a flowchart illustrating a process of a transmission destination relay device (first)

FIG. 15 through FIG. 17 are flowcharts explaining processes of a transmission destination relay device.

By referring to FIG. 15 through FIG. 17, explanations will be given for a process executed when the relay device 1 illustrated in FIG. 2 is used as a transmission destination device. In the explanations below, it is assumed that when a pattern identifier has been stored in an extension header, position information representing the position, in the payload, of the duplication pattern specified by the pattern identifier is also stored.

The processing unit 12 determines whether or not the reception unit 31 received a frame from the transmission source device relay device 1 (S401). When the processing unit 12 has received a frame from the transmission source relay device 1 (Yes in S401), the processing unit 12 determines whether or not an extension header has been added to a payload including a frame (S402).

When an extension header has been added to a payload (Yes in S402), the processing unit 12 determines whether or not a pattern identifier is included in the extension header (S403). In other words, the processing unit 12 determines whether or not edited data in which an extension header including an identification pattern has been added to the payload has been received from the transmission source relay device 1.

When the processing unit 12 has determined that a pattern identifier is included in the extension header (Yes in 403), the processing unit 12 determinations whether or not the pattern identifier is the same identifier as the pattern identifier included in the extension header of the duplication information 23 (S404).

When the identifier is the same pattern identifier as that included in the extension header of the duplication information 23 (Yes in S404), the processing unit 12 determines whether or not the use condition associated with the pattern identifier included in the extension header is "effective" (S405).

By referring to FIG. 16, an explanation will be given.

When the processing unit 12 has determined that the use condition associated with a pattern identifier stored in the duplication information 23 is "effective" (Yes in S405), the restoration unit 14 obtains a duplication pattern associated with the pattern identifier from the duplication information 23 (S501).

Then, the restoration unit 14 obtains position information included in the extension header of edited data together with the pattern identifier and inserts the obtained duplication pattern to the position represented by the position information in the edited data. Thereby, the restoration unit 14 restores a payload from edited data (S502).

The transfer unit 15 controls the transmission unit 32 and transmits a frame (S503). Then, the relay device 1 terminates the process. Also, when the transfer unit 15 executes S503 subsequently to the process of S502, the transfer unit 15 controls the transmission unit 32 and makes the transmission unit 32 transmit to a transmission destination device a frame including data from which the extension header has been deleted and which includes restored data. When the transfer unit 15 executes the process of S503, subsequently to the processes of S402 and S403, the transfer unit 15 controls the transmission unit 32 and makes the transmission unit 32 transmit to a transmission destination device the frame received in S401 from the transmission source relay device 1 as it is.

By referring to FIG. 15, an explanation will be given.

When the processing unit 12 has determined that an extension header has not been added to a payload in S402 (No in S402), the transfer unit 15 executes the process of S503. Then, the relay device 1 terminates the process.

When the processing unit 12 has determined that a pattern identifier is not included in an extension header in S403 (No in S403), the transfer unit 15 executes the process of S503. Then, the relay device 1 terminates the process.

By referring to FIG. 17, an explanation will be given.

When the pattern identifier is not the pattern identifier included in the extension header of the duplication information 23 (No in S404), the processing unit 12 obtains a duplication pattern from the payload of a frame by using the position information included in the extension header (S601). In other words, "No" in S404 represents that a frame for synchronization was transmitted from the transmission source relay device 1.

Then, the processing unit 12 associates the obtained duplication pattern with the pattern identifier included in the extension header and stores the duplication pattern and the pattern identifier in the duplication information 23 (S602).

Also, the processing unit 12 associates the duplication pattern stored in the duplication information 23 with the frame identifier of the received frame and stores the duplication pattern and the frame identifier (S603).

Further, the processing unit 12 updates the use condition associated with the duplication pattern stored in the duplication information 23 to "new" (S604).

The processing unit 12 deletes the extension header and transmits the frame received in S401 to a transmission destination device (S605). Then, the relay device 1 terminates the process.

When the processing unit 12 has determined that the use condition associated with the pattern identifier stored in the duplication information 23 is not "effective" (No in S405), the processing unit 12 executes the process of S601. Also, when the processing unit 12 has determined in S405 that the use condition associated with the pattern identifier stored in the duplication information 23 is not "effective" (No in S405), the processing unit 12 may refer to a frame identifier associated with the pattern identifier. Also, the processing unit 12 may terminate the process when the referred frame identifier is the same as the frame identifier of the frame received in S401.

By referring to FIG. 15, an explanation will be given.

When the processing unit 12 does not receive a frame from the transmission source relay device 1 (No in S401), the processing unit 12 determines whether or not a frame has been received from a transmission destination device (S406).

When the reception unit 31 has not received a frame from a transmission destination device from the reception unit 31 (No in S406), the processing unit 12 executes the process of S401. In other words, the processing unit 12 waits for a frame to be received.

When the reception unit 31 has received a frame from a transmission destination device (Yes in S406), the processing unit 12 determines whether or not the frame received from the transmission destination device includes the same frame identifier as that of the frame transmitted in S605 (S407).

When the frame received from the transmission destination device includes the same frame identifier as that of the frame transmitted in S605 (Yes in S407), the processing unit 12 updates the use condition of the duplication pattern corresponding to the frame identifier stored in the duplication information 23 to "effective" (S408).

The transfer unit 15 controls the transmission unit 32 and makes the transmission unit 32 transmit the frame received from the transmission destination device to the transmission source relay device 1 (S409). Then, the relay device 1 terminates the process.

When the frame received from the transmission destination device does not include the same frame identifier as that of the frame transmitted in S605 (Yes in S407), the processing unit 12 executes the process of S409. Then, the relay device 1 terminates the process.

Figure 18:
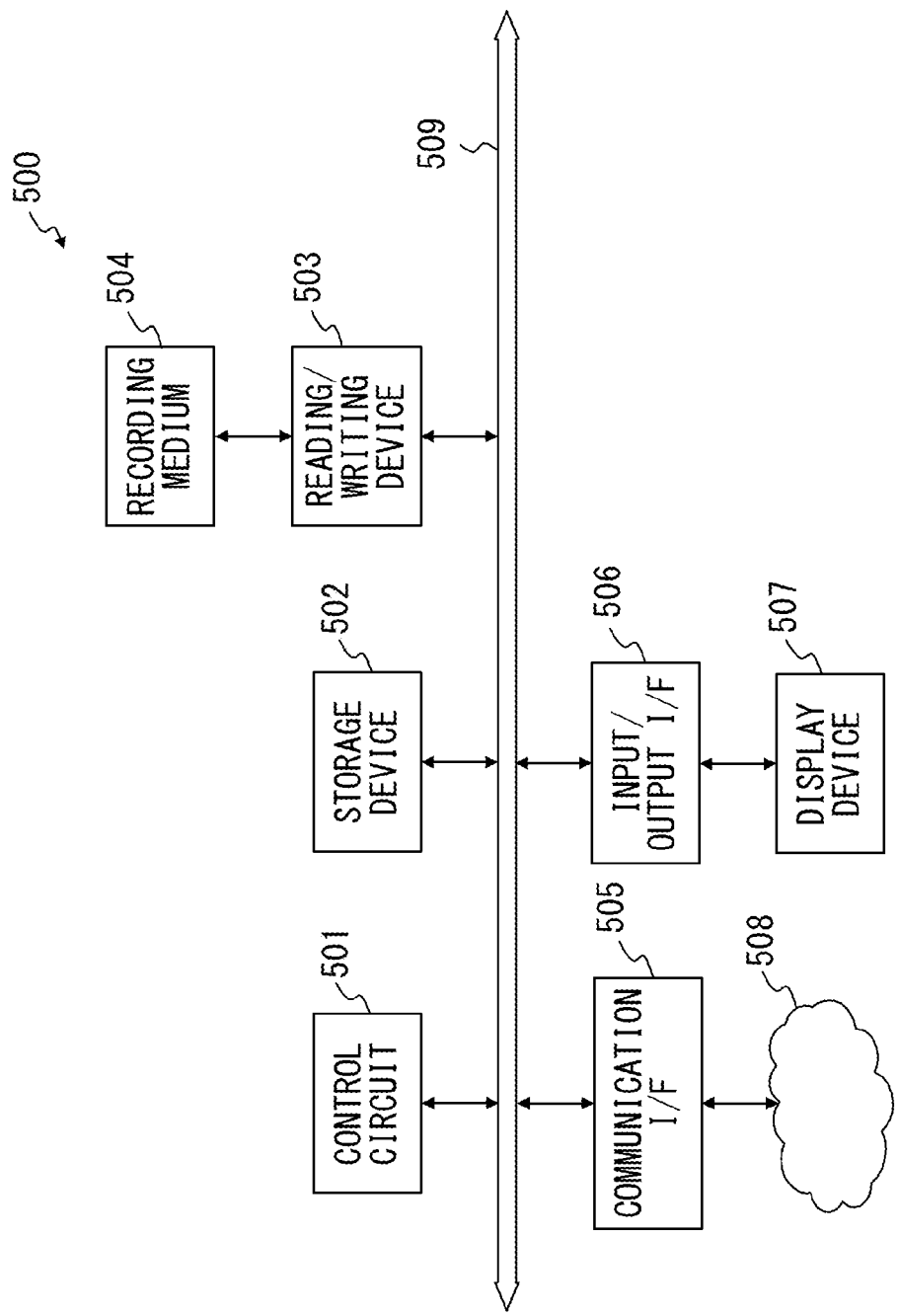
FIG. 18 is a block diagram illustrating an example of a computer apparatus.

FIG. 18 is a block diagram illustrating an example of a computer apparatus.

By referring to FIG. 18, an explanation will be given for a configuration of the relay device 1.

In FIG. 18, a computer apparatus 500 includes a control circuit 501, a storage device 502, a reading/writing device 503, a recording medium 504, a communication interface (communication I/F) 505, an input/output interface (input/output I/F) 506, a display device 507 and a network 508. These constituents are connected via a bus 509.

The control circuit 501 performs the entire control of the computer apparatus 500. The control circuit 501 is for example a processor such as for example a CPU, a multi-core CPU, a Field Programmable Gate Array (FPGA) and a Programmable Logic Device (PLD), etc. The control circuit 501 functions for example as the control unit 10 in FIG. 2. It is also possible for the setting information 21, the payload information 22 and the duplication information 23 stored in the storage unit 20 to be stored in for example cache memories of the CPU, the FPGA and the PLD.

The storage device 502 stores various pieces of data. The storage device 502 includes a computer readable recording medium such as for example a memory such as a Read Only Memory (ROM), a Random Access Memory (RAM), a Hard Disk (HD), etc. The storage device 502 functions as for example the storage unit 20 in FIG. 2. Also, the storage device 502 may store for example the setting information 21, the payload information 22 and the duplication information 23 illustrated in FIG. 2.

Also, the ROM stores a program such as a boot program. The RAM is used as a work area of the control circuit 501. The HD stores programs such as an application program, firmware, etc., and various pieces of data.

The storage device 502 stores a relay program that makes for example the control circuit 501 function as the control unit 10.

When a data transfer process is to be executed, the relay device 1 reads a relay program stored in the storage device 502 onto the RAM. Then, the control circuit 501 executes the relay program read onto the RAM, and thereby the relay device 1 executes a data transfer process including the processes of an edition process and a restoration process.

It is also possible to store the relay program in a storage device included in a server in the network 508 as long as the control circuit 501 can access the relay program via the communication interface 505.

The reading/writing device 503 is controlled by the control circuit 501 and performs read/write of data of the recording medium 504. The reading/writing device 503 is for example a Floppy Disk Drive (FDD), a Compact Disc Drive (CDD), a Digital Versatile Disk Drive (DVDD), a Blu-ray (registered trademark) Disk Drive (BDD), a Universal Serial Bus (USB), etc.

The recording medium 504 stores various types of data. The recording medium 504 stores for example a relay pg. Further, the recording medium 504 may store the setting information 21 and the payload information 22 illustrated in FIG. 2 as the duplication information 23.

The recording medium 504 is connected to the bus 509 via the reading/writing device 503, the control circuit 501 controls the reading/writing device 503 so that read/write of data is performed. Also, the recording medium 504 is for example a Floppy Disk (FD), a Compact Disc (CD), a Digital Versatile Disk (DVD), a Blu-ray Disk (registered trademark) (BD), a flash memory, etc.

The communication interface 505 connects the computer apparatus 500 to a different device via the network 508 so that they perform communication. The communication interface 505 functions for example as the transmission reception unit 30 illustrated in FIG. 2.

The input/output interface 506 is connected to for example a keyboard, a mouse, a touch panel, etc. and outputs a signal input via the bus 509 to the control circuit 501 when receiving a signal representing various types of information from a connected device. Also, when receiving via the bus 509 a signal representing various types of information output from the control circuit 501, the input/output interface 506 outputs that signal to respective devices connected. The input/output interface 506 may receive inputs of for example information such as for example the setting information 21 stored in the storage unit 20 illustrated in FIG. 2.

The display device 507 is connected to for example the input/output interface 506 and displays various types of information.

The network 508 is for example a LAN, wireless communications, the Internet, etc. and connects the computer apparatus 500 and other devices so that communications are possible between them.

As described above, when the relay device 1 according to the embodiment transfers, to a transmission destination device, a frame received from a transmission source device, the relay device 1 makes a search in order to confirm whether or not the payload to be transferred includes a duplication pattern, which is a duplication pattern that is included in a payload received in the past. When the payload to be transferred includes a duplication pattern, the relay device 1 replaces the duplication pattern included in the payload with a pattern identifier for identifying the duplication pattern and transmits the frame to the transmission destination relay device 1. Thereby, the relay device 1 can suppress the amount of traffic between relay devices. Also, the relay device 1 can suppress the reduction in communication speeds between devices, which is caused by a bottleneck due to communications between relay devices.

Also, the relay device 1 according to the embodiment synchronizes the duplication information 23 between connected ports. Thereby, when edited data including an extension header and a payload from which a duplication pattern has been deleted has been received from the transmission source relay device 1, the transmission destination relay device 1 can restore data from the edited data by using information stored in the extension header.

Further, when the relay device 1 according to the embodiment is used as the transmission source relay device 1, the relay device 1 synchronizes the duplication information 23 with the transmission destination relay device 1 by adding an extension header including a pattern identifier, the size and position information of a duplication pattern to the payload of a transmission frame. Accordingly, the relay device 1 can execute a synchronization process of the duplication information 23 between the transmission source relay device 1 and the transmission destination relay device 1 without using a new frame.

When the relay device 1 according to the embodiment is used as the transmission destination relay device 1, the relay device 1 receives from the transmission source relay device 1 a frame in which an extension header including a pattern identifier and the size and position information of a duplication pattern has been added to the payload. Also, the transmission destination relay device 1 obtains a duplication pattern, which is data corresponding to the size of the duplication pattern from the position of the payload represented by the position information. Accordingly, the relay device 1 can execute a synchronization process of the duplication information 23 between the transmission source relay device 1 and the transmission destination relay device 1 without using a new frame.

The relay device 1 extracts a duplication pattern of a size equal to or greater than a size leading to the total of a period of time during which the edition unit 13 edits a payload into edited data and a period of time during which the restoration unit 14 restores the edited data into a payload shorter than a transfer period of time of a duplication pattern. Thereby, the relay device 1 can prevent a transfer time from becoming longer than a case of transmitting a duplication pattern as it is, by for example performing an edition process and a restoration process.

When the relay device 1 according the embodiment performs an edition process, the relay device 1 makes a search in order to confirm whether or not a duplication pattern is included in a payload in the order starting from a duplication pattern with high frequency of being detected as a duplication pattern included in a payload in the duplication pattern. Thereby, the relay device 1 can detect a duplication pattern included in a payload efficiently.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:

1. A relay device that transfers data from a first device to a second device, the relay device comprising:
   a first storage unit configured to store data received from the first device;
   a second storage unit; and
   a processor configured to execute a process including
      extracting a duplication pattern, which is an identical portion between the stored data stored in the first storage unit in the past and data received currently,
      executing a process of storing the currently received data in the first storage unit and a process of associating an identifier with the extracted duplication pattern and storing the extracted duplication pattern and the identifier in the second storage unit,
      editing, when another data including the extracted duplication pattern stored in the second storage unit has been received from the first device, the another data into edited data in which the extracted duplication pattern included in the another data has been replaced with the identifier associated with the extracted duplication pattern,
      adding to the edited data an extension header including size information representing a size of the extracted duplication pattern in the another data and position information representing a position of the extracted duplication pattern in the another data, and
      transferring to the second device the edited data to which the extension header is added.

2. The relay device according to claim 1, wherein when edited data exists including the identifier stored in the second storage unit among data received from the second device, the processor further replaces the identifier included in the received edited data with the extracted duplication pattern associated with the identifier and restores original data, which is data before edition, from the received edited data.

3. The relay device according to claim 2, wherein the processor further extracts a duplication pattern of a size equal to or greater than a size leading to a total of a period of time during which the original data is edited into the edited data and a period of time during which the edited data is restored into the original data shorter than a transfer period of time of the duplication pattern.

4. The relay device according to claim 2, wherein the processor further
receives, from the second device, duplication pattern information including the extracted duplication pattern extracted by the second device and the identifier associated with the extracted duplication pattern,
executes a process of storing in the second storage unit the extracted duplication pattern and the identifier included in the received duplication pattern information,
transmits the received duplication pattern information to the first device, and
starts use of the extracted duplication pattern and the identifier included in the received duplication pattern information in a restoration process when return information in response to the transmitting of the received duplication pattern information has been received from the first device.

5. The relay device according to claim 2, wherein the processor further includes, in the edited data, the position information representing the position of the extracted duplication pattern in the another data when the extracted duplication pattern is replaced with the identifier.

6. The relay device according to claim 5, wherein the processor further inserts the extracted duplication pattern into the position represented by the position information included in the edited data and restores the original data from the edited data when edited data exists including the position information among data received from the second device.

7. The relay device according to claim 1, wherein the processor further transmits data including the extracted duplication pattern and the identifier associated with the extracted duplication pattern to the second device.

8. The relay device according to claim 1, wherein the processor further
transmits duplication pattern information including the extracted duplication pattern included in the another data and the identifier associated with the extracted duplication pattern to the second device, and
starts use of the extracted duplication pattern and the identifier included in the duplication pattern information in an edition process when return information in response to transmission of the duplication pattern information has been received from the second device.

9. The relay device according to claim 1, wherein when data exists including first information representing a size of the extracted duplication pattern and second information representing a position of the extracted duplication pattern among data received from the second device, the processor further obtains a duplication pattern of a size specified by the size of the extracted duplication pattern represented by the first information from the position represented by the second information.

10. The relay device according to claim 1, wherein the processor further makes a search in order to confirm whether or not the extracted duplication pattern is included in the another data in an order from the extracted duplication pattern with high frequency of being used in the edition process when the edition process is performed.

11. The relay device according to claim 1, wherein the processor further adds the extension header including the identifier to the edited data when the extracted duplication pattern is replaced with the identifier.

12. A relay method executed by a processor of a relay device, wherein the processor
extracts a duplication pattern, which is an identical portion between data stored in the past in a first storage unit that stores data received from a first device and data received currently,
stores the currently received data in the first storage unit,
associates an identifier with the extracted duplication pattern extracted in the extracting and stores the extracted duplication pattern and the identifier in a second storage unit,
edits, when another data including the extracted duplication pattern stored in the second storage unit has been received from the first device, the another data into edited data in which the extracted duplication pattern included in the another data has been replaced with the identifier associated with the extracted duplication pattern,
adds to the edited data an extension header including size information representing a size of the extracted duplication pattern in the another data and position information representing a position of the extracted duplication pattern in the another data, and
transfers to a second device the edited data to which the extension header is added.

13. The relay device according to claim 12, wherein when edited data exists including the identifier stored in the second storage unit among data received from the second device, the processor further replaces the identifier included in the received edited data with the extracted duplication pattern associated with the identifier and restores original data, which is data before edition, from the received edited data.

14. A non-transitory computer-readable recording medium having stored therein a program for causing a computer to execute a process comprising:
extracting a duplication pattern, which is an identical portion between data stored in the past in a first storage unit that stores data received from a first device and data received currently;
storing the currently received data in the first storage unit;
associating an identifier with the extracted duplication pattern extracted in the extracting and storing the extracted duplication pattern and the identifier in a second storage unit;
editing, when another data including the extracted duplication pattern stored in the second storage unit has been received from the first device, the another data into edited data in which the extracted duplication pattern included in the another data has been replaced with the identifier associated with the extracted duplication pattern;
adding to the edited data an extension header including size information representing a size of the extracted duplication pattern in the another data and position information representing a position of the extracted duplication pattern in the another data; and
transferring to a second device the edited data to which the extension header is added.

15. The non-transitory computer-readable recording medium according to claim 14, that causes a computer to execute a process including
  replacing, when edited data exists including the identifier stored in the second storage unit among data received from the second device, the identifier included in the received edited data with the extracted duplication pattern associated with the identifier and restoring original data, which is data before edition, from the received edited data.

16. A relay system that transfers data from a first device to a second relay device via a first relay device, wherein a first relay device includes
  a first storage unit configured to store data received from the first device,
  a second storage unit, and
  a first processor configured to execute a process including
    extracting a duplication pattern, which is an identical portion between data stored in the first storage unit in the past and data received currently,
    executing a process of storing the currently received data in the first storage unit and a process of associating an identifier with the extracted duplication pattern and storing the duplication pattern and the identifier in the second storage unit,
    editing data into edited data in which a duplication pattern included in the data has been replaced with the identifier associated with the duplication pattern when the data including a duplication pattern stored in the second storage unit has been received from the first device, and
    transmitting data including the duplication pattern and an identifier associated with the duplication pattern and the edited data to the second relay device, and
the second relay device includes
  a third storage unit, and
  a second processor configured to execute a process including
    associating a received duplication pattern and an identifier and storing the duplication pattern and the identifier when data exits including a duplication pattern and an identifier associated with a duplication pattern among data received from the first relay device, and
    replacing an identifier included in edited data with a duplication pattern associated with the identifier and restoring original data, which is data before edition, from the edited data when the edited data exists including an identifier stored in the third storage unit among data received from the first relay device.

* * * * *